United States Patent [19]

Inoue et al.

[11] 4,336,612
[45] Jun. 22, 1982

[54] ERROR CORRECTION ENCODING AND DECODING SYSTEM

[75] Inventors: Toru Inoue; Yasuo Sugiyama; Ken Onishi, all of Amagasaki, Japan

[73] Assignee: Mitsubishi Denki Kabushiki Kaisha, Tokyo, Japan

[21] Appl. No.: 150,654

[22] Filed: May 16, 1980

Related U.S. Application Data

[63] Continuation-in-part of Ser. No. 3,941, Jan. 16, 1979, abandoned.

[30] Foreign Application Priority Data

Jan. 17, 1978 [JP] Japan ................................. 53-4012

[51] Int. Cl.³ .......................................... G06F 11/10
[52] U.S. Cl. ...................................... 371/39; 371/38
[58] Field of Search .................. 371/39, 40, 37, 38

[56] References Cited

U.S. PATENT DOCUMENTS 4,206,440 6/1980 Doi et al. ............................. 371/38
4,211,997 7/1980 Rudnick et al. ..................... 371/38
4,238,852 12/1980 Iga et al. ............................. 371/38

OTHER PUBLICATIONS

Burton, Cyclic Product Codes, IEEE Transactions on Info. Theory, Jul. 1965, pp. 433-439.

*Primary Examiner*—Charles E. Atkinson
*Attorney, Agent, or Firm*—Wenderoth, Lind & Ponack

[57] ABSTRACT

A rectangular array of 6×150 bits is divided into 50 rectangular arrays of 8×3 bits with 2 check bits added, resulting in 50 codes $C_2$. This encoding is executed 50 times to form a rectangular array of 8×150 bits and each of its rows is encoded into a code $C_1$ of 166 bits with 16 check bits added. This encoding is executed eight times to form a codeword of a generalized product code, which includes 8×166 bits and each row following 12 synchronizing bits. Errors are detected in the codes $C_1$ decoded from the codeword to produce erasure information which is utilized to correct the code $C_2$. Then, the original array is reproduced.

14 Claims, 36 Drawing Figures

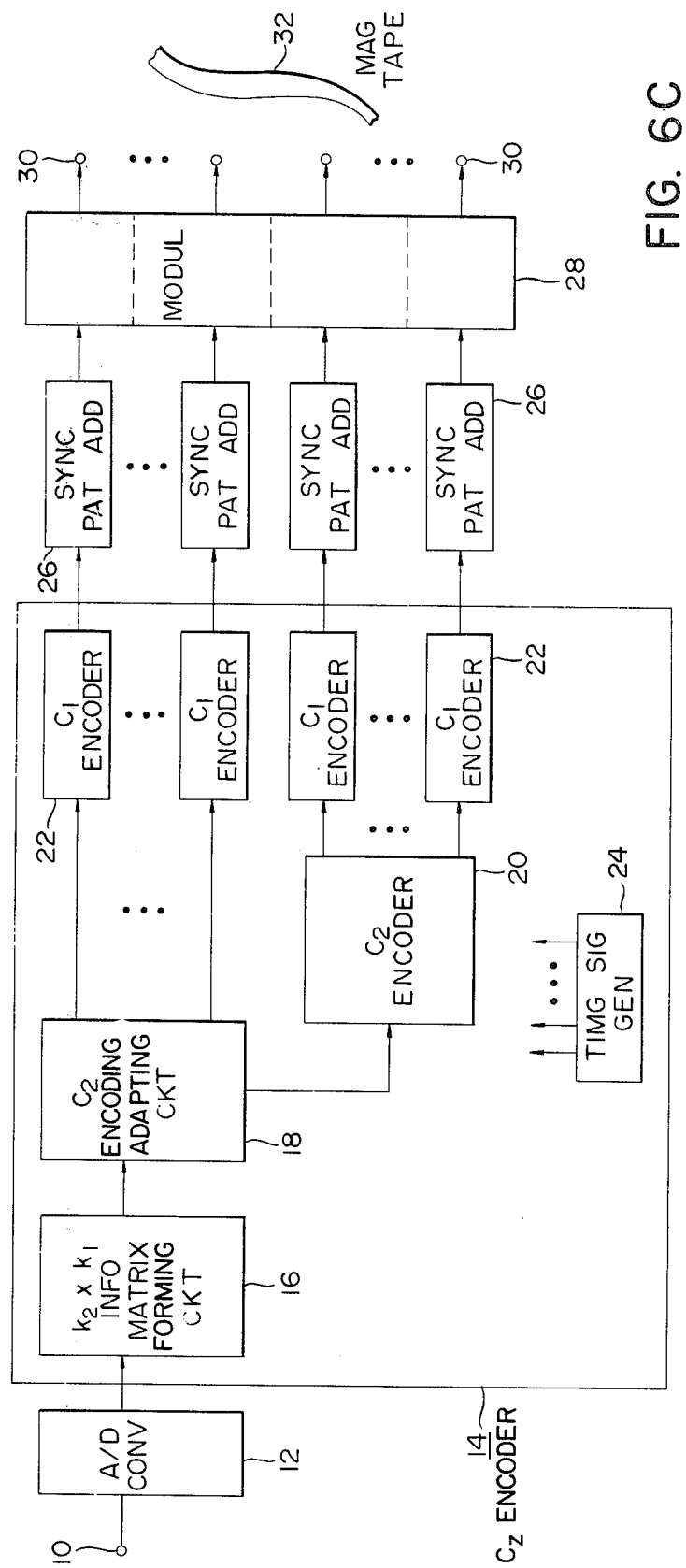

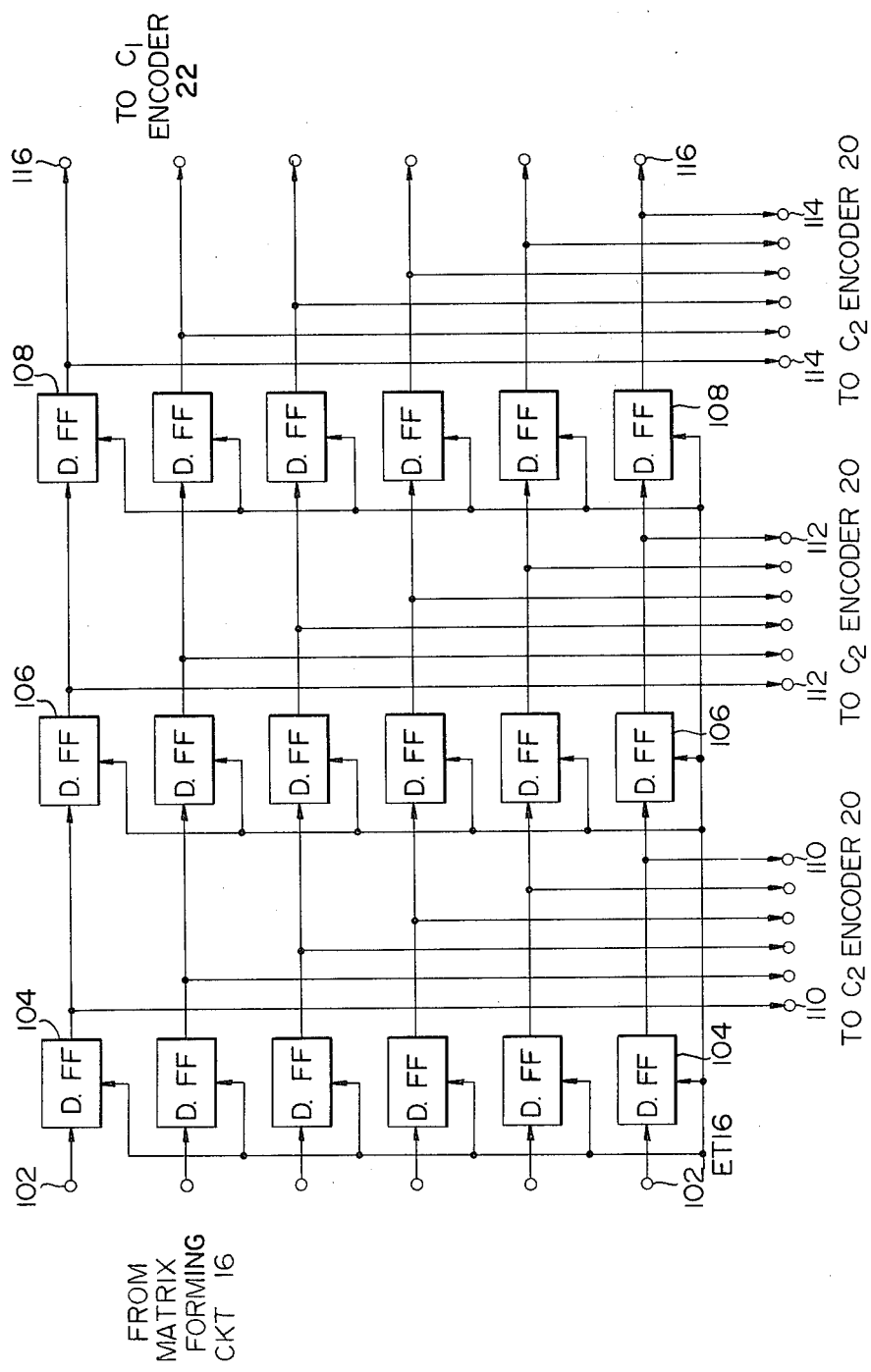

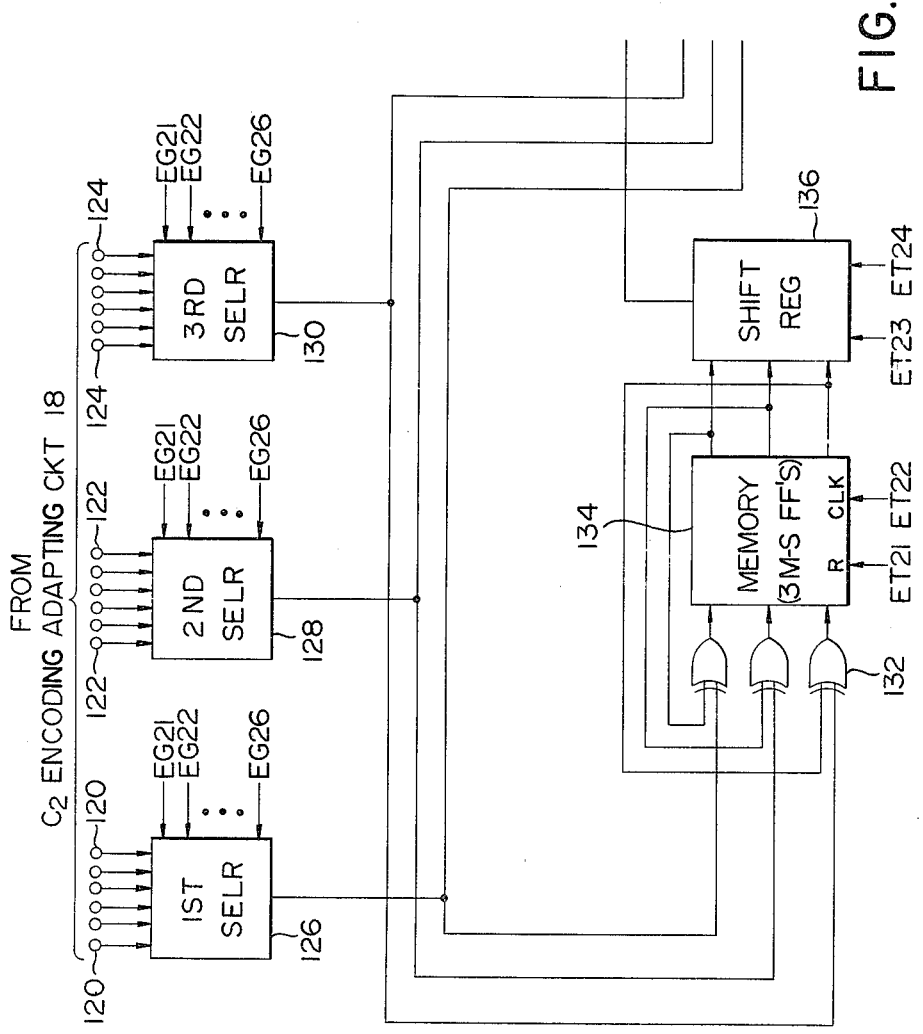

| ADDRESS | | DATA |
|---|---|---|
| $\alpha_i$ | $a_i$ | $a_i \alpha_i$ |
| 0 0 0 | 0 0 0 | 0 0 0 |
| 0 0 0 | 0 0 1 | 0 0 0 |
| 0 0 0 | 0 1 0 | 0 0 0 |
| ⋮ | ⋮ | ⋮ |
| 0 0 1 | 0 0 0 | 0 0 0 |
| 0 0 1 | 0 0 1 | 0 0 1 |
| 0 0 1 | 0 1 0 | 0 1 0 |
| ⋮ | ⋮ | ⋮ |
| 0 1 0 | 0 0 0 | 0 0 0 |
| 0 1 0 | 0 0 1 | 0 1 0 |
| 0 1 0 | 0 1 0 | 1 0 0 |
| 0 1 0 | 0 1 1 | 1 1 0 |
| ⋮ | ⋮ | ⋮ |
| 1 1 1 | 1 1 1 | 0 1 1 |

| INPUT | | | | | | | | OUTPUT $\alpha_j$ | | | $\alpha_i$ | | |
|---|---|---|---|---|---|---|---|---|---|---|---|---|---|
| a | b | c | d | e | f | g | h | x | y | z | u | v | w |
| 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 1 | 1 | 1 |
| 0 | 1 | 0 | 0 | 0 | 0 | 0 | 0 | 0 | 0 | 0 | 1 | 1 | 0 |
| 0 | 0 | 1 | 0 | 0 | 0 | 0 | 0 | 0 | 0 | 0 | 1 | 0 | 1 |
| 0 | 0 | 0 | 1 | 0 | 0 | 0 | 0 | 0 | 0 | 0 | 1 | 0 | 0 |
| 0 | 0 | 0 | 0 | 1 | 0 | 0 | 0 | 0 | 0 | 0 | 0 | 1 | 1 |
| 0 | 0 | 0 | 0 | 0 | 1 | 0 | 0 | 0 | 0 | 0 | 0 | 1 | 0 |
| 0 | 0 | 0 | 0 | 0 | 0 | 1 | 0 | 0 | 0 | 0 | 0 | 0 | 1 |
| 0 | 0 | 0 | 0 | 0 | 0 | 0 | 1 | 0 | 0 | 0 | 0 | 0 | 0 |
| 1 | 1 | 0 | 0 | 0 | 0 | 0 | 0 | 1 | 1 | 0 | 1 | 1 | 1 |
| 1 | 0 | 1 | 0 | 0 | 0 | 0 | 0 | 1 | 0 | 1 | 1 | 1 | 1 |
| 1 | 0 | 0 | 1 | 0 | 0 | 0 | 0 | 1 | 0 | 0 | 1 | 1 | 1 |
| 1 | 0 | 0 | 0 | 1 | 0 | 0 | 0 | 0 | 1 | 1 | 1 | 1 | 1 |
| 1 | 0 | 0 | 0 | 0 | 1 | 0 | 0 | 0 | 1 | 0 | 1 | 1 | 1 |
| 1 | 0 | 0 | 0 | 0 | 0 | 1 | 0 | 0 | 0 | 1 | 1 | 1 | 1 |
| 1 | 0 | 0 | 0 | 0 | 0 | 0 | 1 | 0 | 0 | 0 | 1 | 1 | 1 |
| 0 | 1 | 1 | 0 | 0 | 0 | 0 | 0 | 1 | 0 | 1 | 1 | 1 | 0 |
| 0 | 1 | 0 | 1 | 0 | 0 | 0 | 0 | 1 | 0 | 0 | 1 | 1 | 0 |
| 0 | 1 | 0 | 0 | 1 | 0 | 0 | 0 | 0 | 1 | 1 | 1 | 1 | 0 |
| 0 | 1 | 0 | 0 | 0 | 1 | 0 | 0 | 0 | 1 | 0 | 1 | 1 | 0 |
| 0 | 1 | 0 | 0 | 0 | 0 | 1 | 0 | 0 | 0 | 1 | 1 | 1 | 0 |
| 0 | 1 | 0 | 0 | 0 | 0 | 0 | 1 | 0 | 0 | 0 | 1 | 1 | 0 |
| 0 | 0 | 1 | 1 | 0 | 0 | 0 | 0 | 1 | 0 | 0 | 1 | 0 | 1 |
| 0 | 0 | 1 | 0 | 1 | 0 | 0 | 0 | 0 | 1 | 1 | 1 | 0 | 1 |
| 0 | 0 | 1 | 0 | 0 | 1 | 0 | 0 | 0 | 1 | 0 | 1 | 0 | 1 |
| 0 | 0 | 1 | 0 | 0 | 0 | 1 | 0 | 0 | 0 | 1 | 1 | 0 | 1 |
| 0 | 0 | 1 | 0 | 0 | 0 | 0 | 1 | 0 | 0 | 0 | 1 | 0 | 1 |
| 0 | 0 | 0 | 1 | 1 | 0 | 0 | 0 | 0 | 1 | 1 | 1 | 0 | 0 |
| 0 | 0 | 0 | 1 | 0 | 1 | 0 | 0 | 0 | 1 | 0 | 1 | 0 | 0 |
| 0 | 0 | 0 | 1 | 0 | 0 | 1 | 0 | 0 | 0 | 1 | 1 | 0 | 0 |
| 0 | 0 | 0 | 1 | 0 | 0 | 0 | 1 | 0 | 0 | 0 | 1 | 0 | 0 |
| 0 | 0 | 0 | 0 | 1 | 1 | 0 | 0 | 0 | 1 | 0 | 0 | 1 | 1 |
| 0 | 0 | 0 | 0 | 1 | 0 | 1 | 0 | 0 | 0 | 1 | 0 | 1 | 1 |
| 0 | 0 | 0 | 0 | 1 | 0 | 0 | 1 | 0 | 0 | 0 | 0 | 1 | 1 |
| 0 | 0 | 0 | 0 | 0 | 1 | 1 | 0 | 0 | 0 | 1 | 0 | 1 | 0 |
| 0 | 0 | 0 | 0 | 0 | 1 | 0 | 1 | 0 | 0 | 0 | 0 | 1 | 0 |
| 0 | 0 | 0 | 0 | 0 | 0 | 1 | 1 | 0 | 0 | 0 | 0 | 0 | 1 |

FIG. 18

ERROR CORRECTION ENCODING AND DECODING SYSTEM

This is a continuation-in-part of abandoned U.S. patent application Ser. No. 3,941, filed Jan. 16, 1979.

BACKGROUND OF THE INVENTION

This invention relates to an encoding and decoding system for digital information having a two-dimensional array of bits and more particularly to an encoding and decoding system including error correcting means to correct errors occurring during the transmission, or recording and reproducing.

In order to correct the burst errors, there have been already known product codes and concatenated codes. The product codes have been unsuitable for increasing the error correcting capability of encoding and decoding systems as will be described hereinafter while the use of concatenated codes has resulted in extremely complicated hardware of the calculation circuits involved as will be also described later.

SUMMARY OF THE INVENTION

Accordingly, it is an object of the present invention to provide a new and improved encoding and decoding system for digital information with an increased error-correcting capability.

It is another object of the present invention to provide a new and improved encoding and decoding system for digital information including hardware formed of a small number of components thereof.

The present invention relates to an encoding and decoding system for digital information having a two-dimensional array of bits including $k_1$ bits disposed in a first direction or a horizontal direction and $k_2$ bits disposed in a second direction orthogonal to the first direction or a vertical direction. In order to encode the two-dimensional or rectangular array of $k_2 \times k_1$ bits, the latter is first divided into f rectangular arrays each including b bits in the first direction where b is equal to $k_1$ divided by f which is an integer. The rectangular array including $k_2 \times b$ bits is regarded as $k_2$ information symbols including b bits. Those $k_2$ information symbols are added with $m_2$ check symbols in accordance with a predetermined encoding algorithm to be encoded into $n_2$ symbols whereby a $(n_2, k_2)$ code $C_2$ over a Galois field $GF(2^b)$ are formed. The process as described above is executed f times.

Then, assuming that f symbols each including b bits are again regarded as $k_1$ bits, predetermined $m_1$ check bits are added to the $k_1$ bits in the horizontal direction and then encoded into a symbol including $n_1$ bits whereby a $(n_1, k_1)$ code $C_1$ over a Galois field $GF(2)$ is formed. The process as described above is executed $n_2$ times. Codes $C_Z$ thus formed are generalized product codes and are also called $(n_1n_2, k_1k_2)$ codes over the Galois field $GF(2)$.

By selecting the parameter for the $(n_2, k_2)$ codes $C_2$ over the Galois field $GF(2^b)$ so as to hold $n_2 \leq 2^b + 1$, it is possible to use a maximum distance separable (which may be abbreviated to MDS") code as the code $C_2$.

As a result, the generalized product code can be identical in capability to the concatenated code and makes it possible to form encoders and decoders having less hardware than that required for the concatenated code. Furthermore, it will be apparent that the generalized product code is superior in error correcting capability to the concatenated.

BRIEF DESCRIPTION OF THE DRAWINGS

The present invention will become more readily apparent from the following detailed description, taken in conjunction with the accompanying drawings, in which:

FIGS. 6A and 6B in combination are a block diagram of one embodiment of the present invention applied to a PCM recording and reproducing apparatus;

FIG. 6C is the arrangement of FIGS. 6A and 6B;

FIG. 10 is a block diagram of the encoding adapting circuit for codes $C_2$ shown in FIG. 6A;

FIGS. 11A and 11B in combination are a block diagram of the $C_2$ and $C_1$ encoders shown in FIG. 6A;

FIG. 11C is the arrangement of FIGS. 11A and 11B;

FIG. 13 is a table illustrating binary numbers corresponding to elements of a Galois field $GF(2^3)$;

FIG. 18 is a table illustrating inputs to and outputs from the erasure location calculation circuit shown in FIG. 17;

DESCRIPTION OF THE PREFERRED EMBODIMENT

Figure 1:
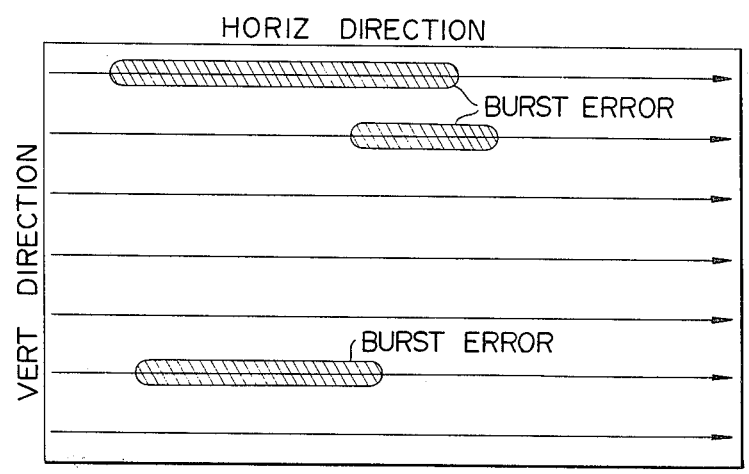
FIG. 1 is a diagram of burst errors occurring in digital information having a rectangular array of bits in which the present invention is directed towards.

For a better understanding of the nature of the present invention, conventional codes used in encoding and decoding systems will now be described. As shown in FIG. 1, burst errors may occur in the horizontal direction. Also those burst errors occur randomly in the vertical direction. Such errors occur sometimes in parallel channels or multitrack tape recording systems upon dropout. The present invention contemplates the correction of burst errors such as those shown in FIG. 1.

Among error correcting codes of the type having a rectangular array of bits, there have been already known product codes and concatenated codes. In a codeword of a product code shown in FIG. 2, original bit information is located in an upper and lefthand rectangular section as viewed in FIG. 2 including $k_{12}$ rows and $k_{11}$ columns. Thus original information bits are arranged in a two-dimensional arrangement or a rectangular array having the $k_{12}$ rows and $k_{11}$ columns. Then a predetermined number $m_{11}$ of check bits is added to the bits in each row in the horizontal direction shown at the arrow A in FIG. 1 to form a code $C_{11}$ while a predetermined number $m_{12}$ of check bits is added to the bits in each column in the vertical direction shown at the arrow B in FIG. 1 to form a code $C_{12}$. The code $C_{11}$ forms a binary $(n_{11}, k_{11})$ code wherein $n_{11}=k_{11}+m_{11}$ and the code $C_{12}$ also forms a binary $(n_{12}, k_{12})$ code where $n_{12}=k_{12}+m_{12}$. Therefore a product code $C_x$ is shown as being formed of the code $C_{11}$ called a row code and the code $C_{12}$ called a column code and form a $(n_{11}n_{12}, k_{11}k_{12})$ code over a Galois field GF(2).

In order to correct a burst pattern such as shown in FIG. 1 by using the product code, it is assumed that the code $C_{11}$ is formed of a burst error correcting binary $(n_{11}, k_{11})$ code and can correct a single burst error having a length of not greater than $l_{11}$. It is also assumed that the code $C_{12}$ is formed of a random error correcting binary $(n_{12}, k_{12})$ code and can correct any combination of error bits whose number is not greater than $t_{12}$.

With the error pattern of FIG. 1 including $U_{12}$ burst errors, it is assumed that $U_{12}^{(0)}$ and $U_{12}^{(1)}$ burst errors have their lengths which are not longer than 1 and not shorter than $l_{11}+1$ where $U_{12}^{(1)}=U_{12}-U_{12}^{(0)}$. Under the assumed conditions, the product code $C_x$ can correct the error pattern as long as $U_{12}^{(1)} \leq t_{12}$.

Figure 2:
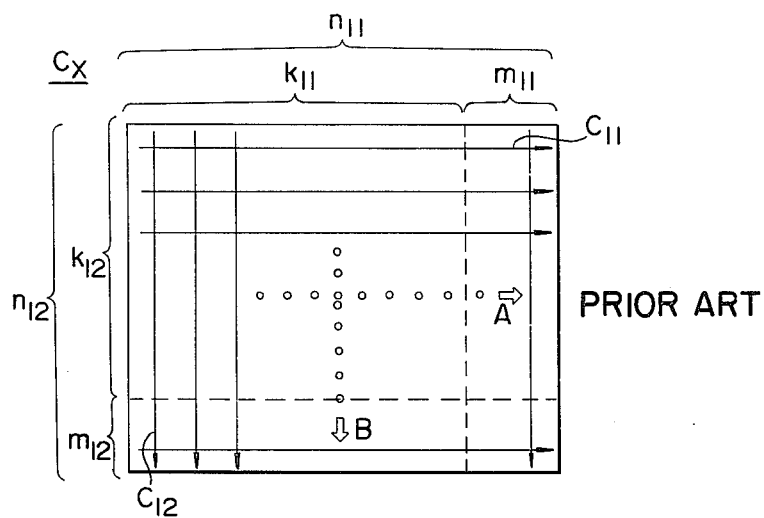
FIG. 2 is a diagram of a codeword of a product code well known in the art.
Figure 3:
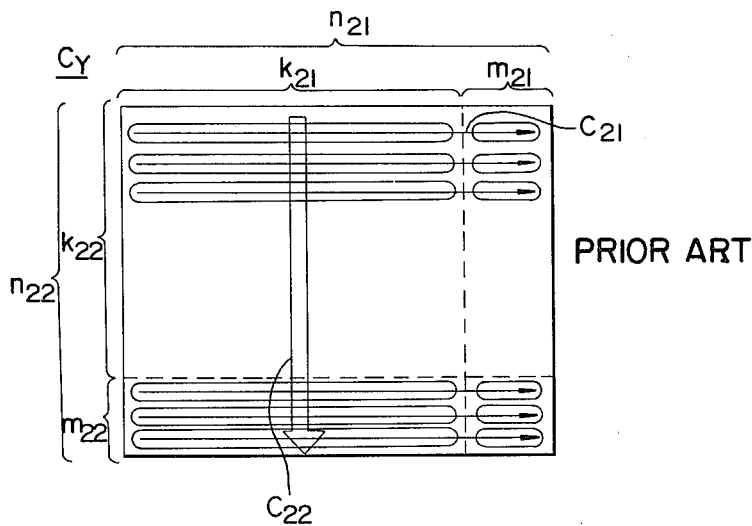
FIG. 3 is a diagram similar to FIG. 2 but illustrating a codeword of a concatenated code also well known in the art.

In a codeword of a concatenated code shown in FIG. 3, original information bits are arranged in a rectangular array located in an upper and lefthand section as viewed in FIG. 3 including $k_{22}$ rows and $k_{21}$ columns as in the array of FIG. 2. However, original digital information including $k_{22} \times k_{21}$ bits are first regarded as informations symbols each including $k_{22}$ information bits.

Those $k_{22}$ information symbols are added with $m_{22}$ check symbols respectively and encoded into $n_{22}$ symbols according to a predetermined encoding algorithm whereby $(n_{22}, k_{22})$ codes $C_{22}$ over a Galois field $GF(2^{k_{21}})$ are formed. Then every $k_{21}$ bits of each symbol are added with $m_{21}$ check bits and encoded into $(n_{21}, k_{21})$ codes $C_{21}$ over a Galois field GF(2) according to a predetermined encoding algorithm with each of the codes $C_{21}$ including $n_{21}$ bits. The code $C_{22}$ and the codes $C_{21}$ are called "outer codes" and "inner codes" respectively. The codes $C_{21}$ and $C_{22}$ form a concatenated code $C_y$ that is a $(n_{21}n_{22}, k_{21}k_{22})$ code over the Galois field GF(2).

Where the concatenated code $C_y$ is used to correct an error pattern such as shown in FIG. 1, it is assumed that the code $C_{21}$ is formed of a burst error correcting binary $(n_{21}, k_{21})$ code over the Galois field GF(2) and can correct a single burst error having a length which is not longer than $l_{21}$. It is also assumed that the code $C_{22}$ is formed of a random error correcting binary $(n_{22}, k_{22})$ code over the Galois field $GF(2^{k_{21}})$ and can correct any combination of error symbols having a number which is not greater than $t_{22}$. Furthermore, it is assumed that a maximum distance separable code is used as the code $C_{22}$.

Where the error pattern, such as that shown in FIG. 1, includes $U_{22}$ burst errors, it is assumed that $U_{22}^{(0)}$ burst errors have lengths which are not longer than $l_{21}$ and $U_{22}^{(1)}$ burst errors have lengths which are not shorter than $l_{21}+1$ where $U_{22}^{(1)}=U_{22}-U_{22}^{(0)}$. Under the assumed conditions, the concatenated code $C_y$ can correct such an error pattern as long as $U_{22}^{(1)} \leq t_{22}$.

The outer code $C_{22}$ of the concatenated code $C_y$ is defined over the Galois field $GF(2^{k_{21}})$ and therefore an encoder and a decoder therefor is required to be operatively associated with calculation circuits operative over the Galois field $GF(2^{k_{21}})$. As a result, an increase in $2^{k_{21}}$ causes the hardware of the calculation circuits to be too complicated to be realized. On the other hand, if $k_{21}$ decreases in value, then a code rate and therefore its efficiency is decreased. Assuming that the number of the check bits included in the code $C_{21}$ or $m_{21}=n_{21}-k_{21}$ decreases as the $k_{21}$ reduces, the code rate is not decreased but the code $C_{21}$ has its capability to correct or detect errors reduced.

On the other hand, the column code $C_{12}$ in the product code $C_x$ is formed of a binary code. The column code $C_{12}$ has a code rate of $k_{12}/n_{12}$ less than that expressed by $k_{22}/n_{22}$ of the outer code $C_{22}$ of the concatenated code resulting in a decrease in efficiency, on the assumption that row codes of the product code are identical in capability to inner codes of the concatenated code and that the column code of the product code has the same minimum distance as that of the concatenated code. This is because the binary code has its capability limited by the Varsharmov-Gilbert bound and because the maximum distance separable code used as the outer code $C_{22}$ of the concatenated code can not be used as the column code $C_{12}$ of the product code.

From the foregoing it is seen that the product code has a capability for correcting errors which are unsuitable for solving the problems in which the present invention is directed while the use of the concatenated code causes the hardware of associated calculation circuits to be much too complicated, as described above.

CONSTRUCTION OF GENERALIZED CODE

Figure 4:
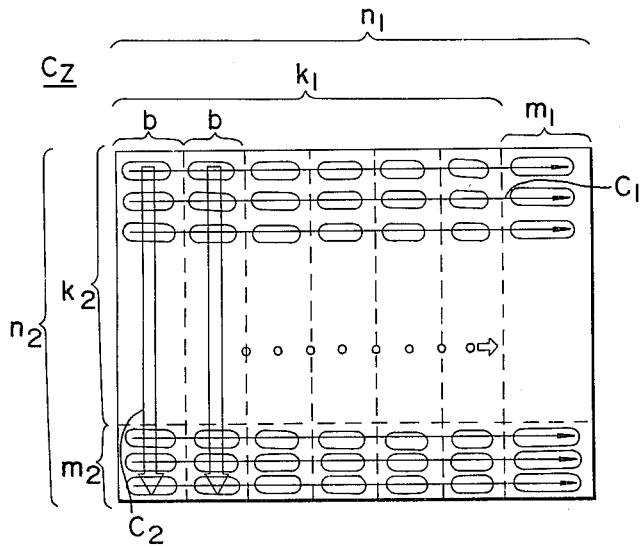
FIG. 4 is a diagram similar to FIG. 2 but illustrating a codeword of a generalized product code used with the present invention.

Referring now to FIG. 4, there is illustrated a codeword of a unique code used with the present invention and called a "generalized product code" which is abbreviated hereinafter as "G.P. code". The G.P. code is composed of $(n_1, k_1)$ codes $C_1$ over the Galois field GF(2) and $(n_2, k_2)$ codes $C_2$ over a Galois field $GF(2^b)$. Original information is shown in the upper and lefthand section as viewed in FIG. 4 as having a rectangular array of bits including $k_{12}$ rows and $k_{11}$ columns.

Figures 5A, 5B, 5C:
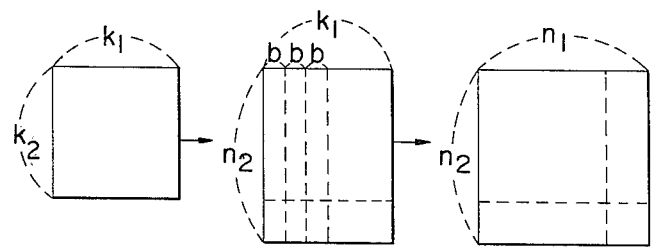
FIGS. 5A, 5B and 5C are diagrams illustrating an encoding process for the generalized product code executed by the present invention.

The encoding process according to the present invention will now be described in conjunction with FIGS. 5A, 5B and 5C, wherein there is illustrated an encoding process executed by the present invention. As shown in FIG. 5A, a rectangular array of $k_2 \times k_1$ bits forming original information is divided in a column direction into f rectangular arrays each including $k_2 \times b$ bits where $b = k_1/f$.

In each of the divided rectangular arrays, a rectangular array of $1 \times b$ bits is regarded as a symbol corresponding to the element of the Galois field $GF(2^b)$ and $k_2$ symbols for the Galois field $GF(2^b)$ are encoded into $n_2$ symbols of the $GF(2^b)$ according to a predetermined encoding algorithm for a code $C_2$ over $GF(2^b)$ after having been added to $m_2$ check symbols over $GF(2^b)$, where $m_2 = n_2 - k_2$. This results in the formation of a rectangular array including $n_2 \times b$ bits.

After the encoding process as described above has been executed f times, a rectangular array including $n_2 \times k_1$ bits as shown in FIG. 5B.

Subsequently the encoding is effected in the row direction with every $k_1$ bits. More specifically $k_1$ bits in each row are added to $m_1$ check bits and encoded into $n_1$ bits according to a predetermined encoding algorithm for a code $C_1$ over the Galois field GF(2), where $m_1 = n_1 - k_1$.

After this encoding process has executed $n_2$ times, a rectangular array including $n_2 \times n_1$ bits is formed as shown in FIG. 5C. That rectangular array results in a codeword of a G.P. code $C_Z$ such as shown in FIG. 4 forming a binary $(n_1 n_2, k_1 k_2)$ code.

CAPABILITY OF G.P. CODE

The capability of the G.P. code thus formed will now be described. Assuming that the codes, $C_1$ and $C_2$ have minimum distances of $d_1$ and $d_2$ respectively, the G.P. code has a minimum distance of $d_1 d_2$. However, how the capability of the G.P. code is usefully used is generally dependent upon (1) the selection of the codes $C_1$ and $C_2$, (2) the correspondence of the configuration of a channel involved to the structure of the G.P. code, (3) the status of errors occurring in the channel and (4) the construction and complexity of the decoder involved. Only for purposes of explanation, the present invention will now be described as based on the following assumptions:

(1) A burst error correcting or detecting code is used as the code $C_1$ and a random error-correcting code is used as the code $C_2$;

(2) It is assumed that parallel channels are used whose number $n_2$ is equal to the code length of the code $C_2$.

(3) It is supposed that an error pattern includes burst errors developed in the horizontal direction but located randomly in the vertical direction as shown in FIG. 1; and (4) The code $C_1$ is first decoded and then the code $C_2$ is decoded.

However it is to be understood that the present invention is equally applicable to conditions other than those described above.

Also it is assumed that the code $C_1$ can correct a single burst error having a length which is not longer than $l_1$ and that the code $C_2$ can correct any combination of error symbols whose number is not greater than $t_2$. Further it is assumed that the error pattern such as shown in FIG. 1 includes $U_2$ burst errors, and that among them $U_2^{(0)}$ burst errors have lengths which are not longer than $l_1$ and $U_2^{(1)}$ burst errors have lengths which are not shorter than $l_1 + 1$ where $U_2^{(1)} = U_2 - U_1^{(0)}$. At that time, the G.P. code $C_Z$ can correct those burst errors as long as $U_2^{(1)} \leq t_2$.

DECODING OF G.P. CODE

In parallel channels, each word of the codeword of the G.P. code in a horizontal direction is transmitted through an associated channel. On the receiver side, the words received through the respective channels are rearranged back into the rectangular array of bits corresponding to the codeword of the G.P. code on the transmitter side.

The decoding may be sorted into two types employing a hard decision and a soft decision.

(a) With the hard decision employed, the words in the row direction corresponding to the codeword of the code $C_1$ are decoded for each channel and simultaneously with all of the $n_2$ channels when the code $C_1$ has been decoded, a rectangular array of $n_2 \times k_1$ bits is formed and then is divided into f rectangular arrays each including $n_2 \times b$ bits. The f rectangular arrays are applied to a $C_2$ decoder where the original $k_2 \times b$ information bits are reproduced. This reproduction is executed with the f rectangular arrays each including $k_2 \times b$ bits.

In the decoding process as described above, the capability of the G.P. code is secured. That is, the $U_2^{(1)}$ burst errors having lengths which are not shorter than $l_1 + 1$ and the $U_2 - U_2^{(1)}$ burst errors having lengths which are not longer than $l_1$ have been corrected as long as $U_2^{(1)} \leq t_2$.

Upon the occurrence of long burst errors always having lengths which are not shorter than $l_1 + 1$, the decoding process as described above can correct the long burst errors whose number is greater than $t_2$.

(b) With the soft decision employed, the code $C_1$ is used as an error detecting code so that error detected information provided by the decoding of the code $C_1$ is used, as erasures, in the process of decoding the codes $C_2$. When the code $C_2$ has been decoded, a $C_1$ decoder is operated to detect errors in the row direction. Then, error detected information is stored in an associated register as erasures. This information indicates which of the words in the row direction has been erroneous.

When the number s of the erasures is not greater than $2t_2$, the value s and error detected location information are entered into a $C_2$ decoder as an erasure weight and erasure location information respectively.

Upon the occurrence of long burst errors having lengths which are not shorter than $l_1 + 1$ alone, it can be expected that the decoding process as described above can correct, in almost all cases, the long burst errors whose number is not greater than $2t_2$.

In order to compare the G.P. code with the conventional product code, it is assumed that the G.P. code is the same in codes in the horizontal direction as the product code and that the G.P. code includes $(n_2, k_2)$ codes in the vertical direction using maximum distance separable codes where $n_2 \leq n^B + 1$. Under the assumed conditions the G.P. code has the capability expressed by $$d_2 = n_2 - k_2 + 1 \tag{1}$$

where $d_2$, $n_2$ and $k_2$ are previously defined.

On the other hand, the product code includes binary $(n_{12}, k_{12})$ codes $C_{12}$ in the column direction and has the capability expressed by $$d_{12} = n_{12} H^{-1}(1 - k_{12}/n_{12}) \tag{2}$$

where $d_{12}$ designates a minimum distance of the codes $C_{12}$ and $H^{-1}(1-k_{12}/n_{12})$ designates an inverse function of a binary entropy function expressed by $$H(x) = -x \log_2 x - (1-x) \log_2 (1-x) \tag{3}$$

By comparing the expression (1) with the expression (2), it is seen that, for $n_2 = n_{12}$ and $k_2 = k_{12}$, $d_2$ is greater than $d_{12}$ so that the G.P. code is superior in capability to the product code.

Also, in order to compare the G.P. code with the concatenated code, it is assumed that the G.P. code is identical in codes in the horizontal direction to the concatenated code and that codes $C_2$ of the G.P. code are maximum distance separable codes as is the outer code $C_{22}$ of the concatenated code. Under the assumed conditions, the G.P. code is substantially identical in capability to the concatenated code provided that $n_2 \leq 2^b + 1$. However, the codes $C_2$ of the G.P. code are defined over the Galois field $GF(2^B)$ whereas the outer codes $C_{22}$ of the concatenated code are defined over the Galois field $GF(2^{R21})$. This means that the former requires a calculation circuit operative over the Galois field $GF(2^B)$ while the latter requires a calculation circuit operative over the Galois field $GF(2^{K21})$ or $GF(2^{bf})$. Therefore, the latter requires the hardware equal to from about f to about $f^2$ times that of the former. It is noted that the use of the G.P. code requires only a control circuit for repeatedly using the same hardware f times. Accordingly, the use of the G.P. code can sharply reduce the hardware needed as compared with the use of the concatenated code.

It is noted that, where $n_2 \approx 2^{k_1} + 1$, the G.P. code is identical to the concatenated code because the parameters of the G.P. code hold $b = k_1$. However, if the system has the parameter $n_2$ much smaller than $2^{k_1} + 1$, then a minimum b can be selected to fulfill $n_2 \leq 2^b + 1$ as the parameter of the G.P. code. Therefore, it may be said that the use of the G.P. codes can have the same capability as the use of concatenated codes with less hardware required than that required for the latter. For example, assuming the present invention is practically applied to a PCM multi-track digital recording apparatus having the parameters $n_2$ of from 8 to 20 and $n_1$ of from 100 to 300, the same includes $n_2$ parallel channels by considering that record tracks form respective channels. Under these circumstances, the use of the concatenated codes requires calculation circuits operative, for example, over the Galois field $GF(2^{100})$ resulting in a complicated hardware configuration. On the other hand, the use of the G.P. codes requires only calculation circuits operative, for example, over the Galois field $GF(2^5)$. Accordingly, the G.P. codes are sharply advantageous over the concatenated codes.

IMPLEMENTATION

Figure 6B:
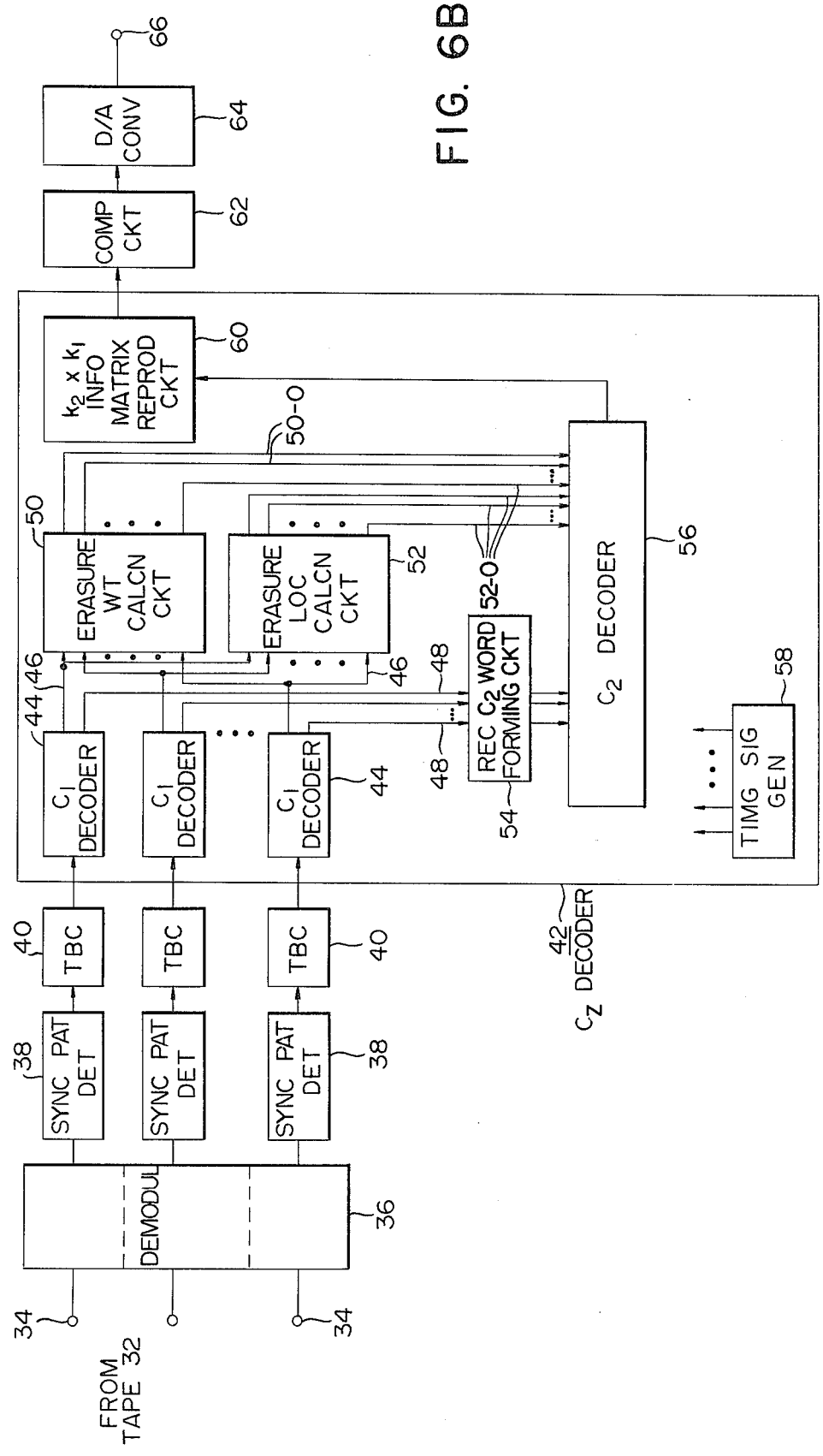

Referring now to FIGS. 6A and 6B, there is illustrated one embodiment according to the encoding and decoding system of the present invention utilizing the G.P. code $C_z$ as shown in FIG. 5 and applied to a PCM multi-track digital recording apparatus. The arrangement illustrated will now be described on the assumption that:

(1) a burst error detecting code is used as the code $C_1$ and a maximum distance separable code having a minimum distance of $2t_2 + 1$ is used as the code $C_2$;

(2) the code $C_2$ included in the G.P. code has a code length $n_2$ selected to be equal to the number of record tracks included in the PCM recording apparatus;

(3) the error pattern as shown in FIG. 1 is caused. That is, burst errors occur in the row direction in which an associated record tape travels and those burst errors are developed randomly in the column direction or in a direction of width of the tape; and (4) the G.P. code is decoded so that the codes $C_1$ are subjected to the error detection to provide erasure information and the codes $C_2$ are subjected to the erasure and error decoding.

The arrangement illustrated in FIG. 6A comprises an input terminal 10 to which an analog musical signal from a microphone (not shown) is applied; an analog-to-digital converter 12 is connected to the input 10 and an encoder 14 for G.P. codes, which is called hereinafter a "$C_Z$ encoder", is connected to the converter 12 and generally designated by the reference numeral 14. The $C_Z$ encoder 14 includes a $k_2 \times k_1$ information matrix forming circuit 16 connected to the analog-to-digital converter 12, a $C_2$ encoding adapting circuit 18 connected to the matrix forming circuit 16, a $C_2$ encoder 20 connected to the adapting circuit 18 and a plurality of $C_1$ encoders connected to the $C_2$ encoding adapting circuit 18. The number of $C_1$ encoders 22 is equal to the number of tracks on an associated magnetic record tape 32. The $C_Z$ encoder 14 further includes a timing signal generator 24 for generating timing signals required for the components thereof to be operated.

Each of the $C_1$ encoders 22 is connected via a synchronizing pattern adding circuit 26 to an associated modulation circuit of a modulator 28 including a plurality of outputs connected to respective magnetic recording heads 30, one for each track of the magnetic record tape 32. The magnetic recording heads 30 record simultaneously the outputs from the modulator 28 on the magnetic record tape 32.

The $C_Z$ encoder 14 forms a codeword of a G.P. code arranged in a rectangular array of $n_2 \times n_1$ bits such as shown in FIG. 4. The codeword is added with synchronizing patterns by the synchronizing pattern generator circuits 26. Then the codeword with the synchronizing patterns is modulated into signals suitable for the magnetic recording by the modulator 28 and modulated signals are recorded on associated tracks on the magnetic record tape 32 by the recording heads 30 respectively.

In the arrangement illustrated in FIG. 6B, a plurality of reproducing heads 34 are operatively coupled to the record tape 32, one for each record track on the latter, to reproduce digital signals from the respective track. Each of the reproducing heads 34 is connected to an associated circuit of a demodulator 36 where the digital signals are demodulated. The demodulator 36 includes a plurality of outputs, one for each track on the tape 32. Those outputs of the demodulator 36 are connected to respective series combinations of a synchronization pattern detector circuit 38 and a time base corrector 40 which are, in turn, connected to a decoder for G.P. codes $C_Z$ (which is called hereinafter a "$C_Z$ decoder") generally designated by the reference numeral 42.

The $C_Z$ decoder 42 includes a plurality of $C_1$ decoders connected to the time base correctors 40 respectively each producing an erasure output 46 indicating that an associated code $C_1$ detects an error or errors and an information output 48. The erasure output 46 from each $C_1$ decoder 44 is delivered to both an erasure weight calculation circuit 50 and an erasure location calculation circuit 52 while the information output 48 therefrom is in the form of a series array of $k_1$ bits corresponding to an information portion of the decoded code $C_1$ resulting from an associated track and those $k_1$ bits are serially delivered to a received $C_1$ word forming circuit 54. The erasure weight calculation circuit 50 includes a plurality of outputs connected to a $C_2$ decoder 56, one for each track on the tape 32, and the erasure location calculation circuit 52 includes also a plurality of outputs connected to the $C_2$ decoder 56, one for each track. Similarly the received word forming circuit of the code $C_2$ 54 is connected to the $C_2$ decoder 56. The $C_2$ decoder 56 output is connected to a $k_2 \times k_1$ information matrix reproducing circuit 60.

The $C_Z$ decoder 42 includes a timing signal generator 58 for generating timing signals which are applied to the components of the $C_Z$ decoder 42.

The $k_2 \times k_1$ information matrix reproducing circuit 60 is connected to a compensation circuit 62 which is subsequently connected to a digital-to-analog converter 64 which is, in turn connected to an output terminal 66 serving to apply a reproduced analog music signal to an amplifier having a loudspeaker (not shown).

In operation, the signals recorded on the tracks on the magnetic record tape 32 are reproduced by the reproducing heads 34 to form a plurality of signal sequences, one for each track. Each of the synchronizing pattern detector circuits 38 detects the synchronizing pattern included in the associated signal sequence to provide a received word corresponding to the code $C_1$ resulting from an associated track. Then, each of the time base correctors 40 absorbs and removes a skew or skews and/or a jitter or jitters from the received word reproduced from the associated track. In this way, a received word has been reproduced in a rectangular array of $n_2 \times n_1$ bits corresponding to a transmitted code word.

The received word of $n_2 \times n_1$ bits is processed in the $C_Z$ decoder 42 as follows:

First, each of the $C_1$ decoders 44 detects whether or not errors have been caused in the received word of $n_1$ bits corresponding to the associated code $C_1$. In the presence of an error, as determined by the $C_1$ decoder 44 the latter applies its erasure output 46 in the form of a binary ONE to both the erasure weight and location calculation circuits 50 and 52 respectively. On the other hand, in the absence of an error, as determined by the $C_1$ decoder 44, the latter applies the erasure output 46 in the form of a binary ZERO to the two circuits 50 and 52.

Each of the $C_1$ decoders 44 also delivers a received $k_1$ bit word, corresponding to an associated information portion included in the received $n_1$ bit word corresponding to the associated code $C_1$, to the received word-of-code $C_2$ forming circuit 54 as an information output 48.

All the $C_1$ decoders 44 perform the operation as described above in a parallel relationship.

The number of tracks including errors, as determined by the $C_1$ decoders 44, are calculated as the number of erasures or erasure weight information, by the erasure weight calculation circuit 50 and then delivered to the $C_2$ decoder 56 through an associated one of leads 50-0.

Also the erasure location calculation circuit 52 uses the erasure outputs 46 to transform the serial numbers of the tracks having the errors occurring thereon the erasure location information in the form required to be calculated in the $C_2$ decoder 56. This information is supplied to the $C_2$ decoder 56 through leads 52-0.

On the other hand, the received work-of-code $C_2$ forming circuit 54 is operated to divide the $k_2$ bits from each $C_1$ decoder 44 into b bits apiece to form rectangular arrays each including $n_2 \times b$ bits and to deliver those arrays to the $C_2$ decoder 56.

Then, the $C_2$ decoder 56 corrects the errors for every $n_2 \times b$ bits on the basis of the received word from the received word-of-code $C_2$ forming circuit 54, the erasure weight information from the erasure weight calculation circuit 50 and the erasure location information from the erasure location calculation circuit 52.

The $C_2$ decoder 56 executes the correction as described above f times where $f = k_1/b$ and supplies outputs to the $k_2 \times k_1$ information matrix reproducing circuit 60 one for every $k_2 \times b$ bits. The $k_2 \times k_1$ information matrix reproducing circuit 60 reproduces a $k_2 \times k_1$ information matrix and applied to; the compensation circuit 62, the analog musical signal in the digital form including the sampled values thereof.

It is assumed that, when the $C_1$ decoders 44 have decoded received words, s erasures are detected and e errors are undetected. In other words, it is assumed that the erasure weight and location calculation cirduits 50 and 52 respectively have entered thereinto information concerning the s erasures alone and no information concerning the e undetected errors. Under the assumed conditions, the capability to correct $t_2$-ple errors of the code $C_2$ can correct the s erasures and the e undetected errors as long as $$s + 2e < 2t_2 + 1 \qquad (4).$$

Also, if the erasure weight calculation circuit 50 calculates an erasure weight of not less than $2t_2 + 1$ or if erasures are detected on $2t_2 + 1$ or more tracks, then no correction is effected while only the detection is effected and the compensation circuit 62 is operated to effect the correction by interpolation by using data in front of and in back of each of the erasures. This is because the reliability is prevented from decreasing.

Furthermore, the arrangement shown in FIGS. 6A and 6B will now be described in more detail with respect to the following concrete example:

(1) There is used a cyclic redundancy check (which is abbreviated to CRC) code known as one of burst error detecting codes as the code $C_1$. A generator polynomial $G(x)$ is given by
$$G(x) = X^{16} + X^{12} + X^5 + 1 \qquad (5)$$

in accordance with the CCITT V 41. As codes $C_2$ (8,6) Reed-Solomon codes over the Galois field $GF(2^3)$ are used. The code parameters include $n_1 = 166$, $k_1 = 150$, $n_2 = 8$ and $k_2 = 6$;

(2) A stationary head, 8-track PCM recording apparatus is considered;

(3) An error pattern caused in an associated magnetic record tape includes burst errors with the mean burst length on the order of from 100 to 500 occurring in the row direction or a direction of travel of the tape and burst errors randomly developed in the column direction or a direction of width of the tape; and (4) In order to decode the G.P. code, error detected information of the CRC code or code $C_1$ is utilized as erasure information to decode the code $C_2$ to thereby correct errors developed on up to two tracks.

DETAILS OF ENCODING UNIT

Figure 7:
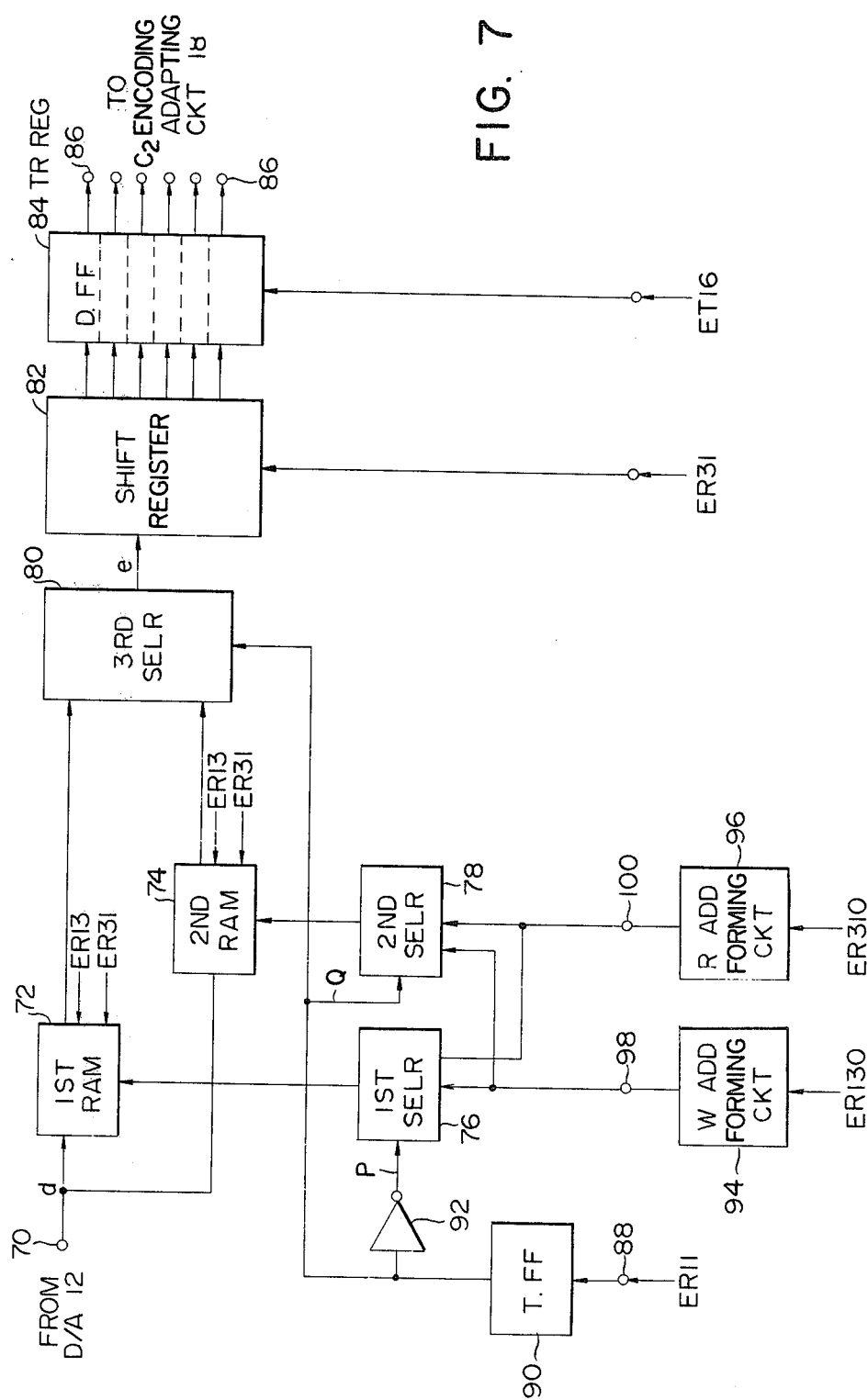
FIG. 7 is a block diagram of the $k_2 \times k_1$ information matrix forming circuit shown in FIG. 6A.

FIG. 7 illustrates, in block diagram form, the details of the $k_2 \times k_1$ information matrix forming circuit 16 shown in FIG. 6A. The arrangement illustrated comprises an input terminal 70 to which digital information from the analog-to-digital converter 12 is applied, a pair of first and second random access memory devices 72 and 74 (which is each abbreviated to "RAM"), a pair of first and second selectors 76 and 78 connected to the first and second RAM devices 72 and 74 respectively and a third selector 80 connected to those RAM devices 72 and 74. Each of the first and second RAM devices 72 and 74 has a storage capacity of $6 \times 178$ bits and is put in the write or read cycle of operation under the control of the associated selector 76 or 78 so that the first RAM device 72 is put in the write cycle of operation, while the second RAM device 74 is put in the read cycle of operation and vice versa. Synchronizing patterns and check bits for codes $C_1$ may be preliminarily stored in each of the RAM devices 72 and 74.

The third selector 80 is connected to a serial in-parallel output type 6 bit shift register 82 which transforms inputs serially applied thereto to outputs supplied in parallel to a transfer register 84 in order to permit the output from the third selector 80 to be recorded on the parallel tracks on the magnetic tape. The transfer register 84 is formed of six D type FLIP-FLOP's each connected to an output terminal 86 subsequently connected to the $C_2$ encoding adapting circuit 18 as shown in FIG. 6A.

Developed at an input terminal 88 is block timing signal ER11 indicating a partition between each pair of adjacent rectangular bit arrays, each including $6 \times 178$ bits in the example illustrated. The pulse ER11 is supplied to a T FLIP-FLOP 90 where it is halved in pulse repetition frequency. The pulse thus halved in frequency is applied to the second and third selectors 78 and 80 on the one hand and applied to the first selector 76 through an inverter 92 on the other hand.

The write address forming circuit 94, including a counter and a counter decoder, responds to pulses ER130 to form write addresses, although the counter and counter are not illustrated. The read address forming circuit 96 similarly forms read addresses in response to RAM read pulses ER310.

Figure 8:
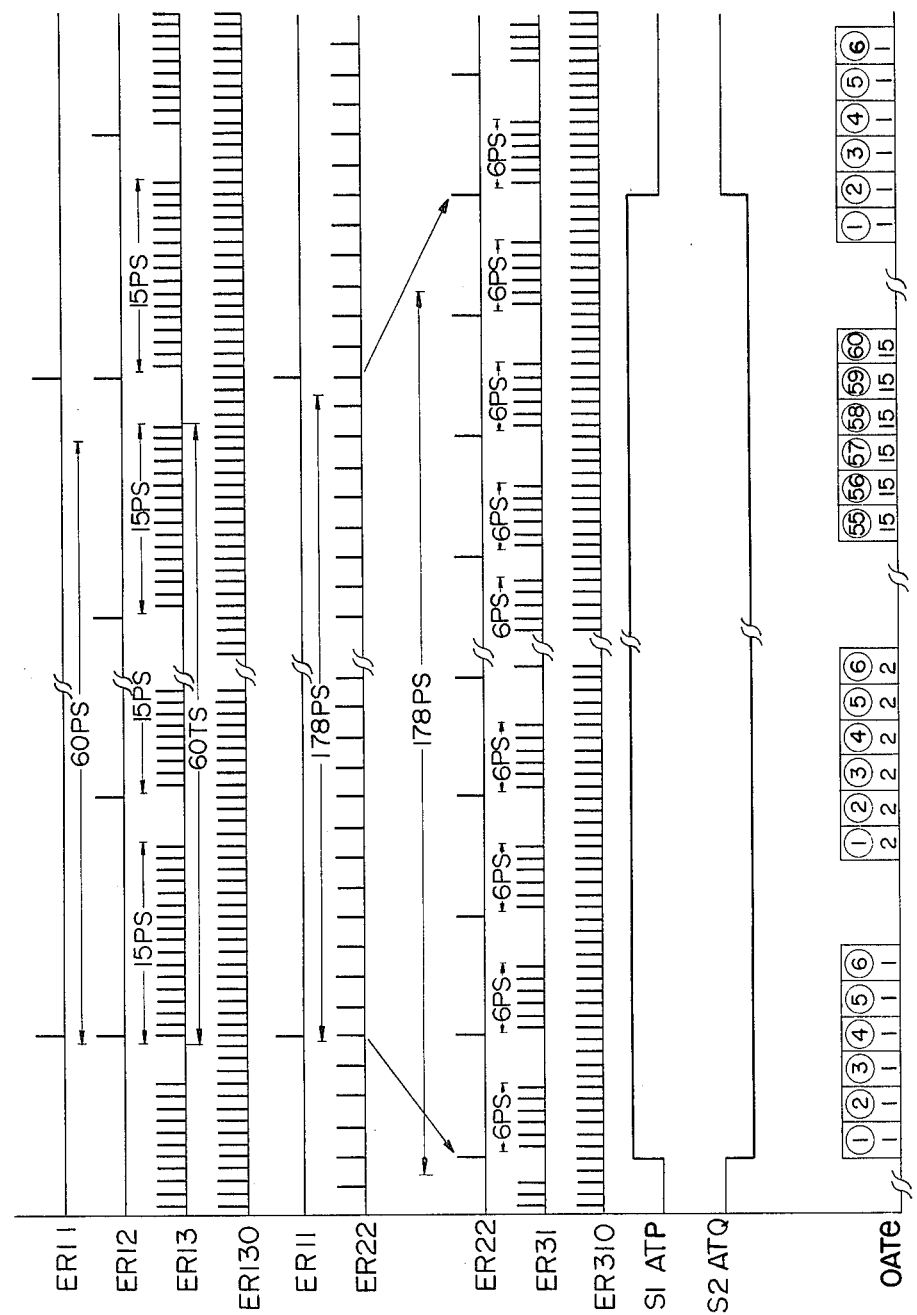
FIG. 8 is a timing chart illustrating timing signals applied to the arrangement shown in FIG. 7.

FIG. 8 shows various clock pulses or timing signals required for operating the essential components of the $k_2 \times k_1$ matrix forming circuit 16 illustrated in FIG. 7.

In FIG. 8, first row shows the block timing signal ER11 as described above and a second row shows clock pulses or sampling signals ER12 for sampling musical information having such a predetermined pulse repetition period that 60 pulses are developed for each pulse repetition period of the block timing signal ER11. The sampling signal ER12 may be a conversion signal for the analog-to-digital converter 12. A third row shows RAM write pulses or signals ER13 which are applied to that RAM device 72 or 74 operated in the write cycle. A fourth row shows a train of reference clock pulses ER130 from which the RAM write pulses ER13 are prepared so that one group of 15 pulses ER13 is developed in each pulse repetition period of the pulses ER12. The reference clock pulses ER130 are supplied to the write address forming circuit 94.

A fifth row shows a replica of the frame pulses ER11 and a sixth row shows bit timing pulses or signals ER22 having such a predetermined pulse repetition period that 178 timing pulses are developed in one pulse repetition period of the block timing signal ER11.

A seventh row shows the pulses ER22 in the extended time base and an eighth row shows RAM read pulses or signals ER31 applied to that RAM device 74 or 72 operated in the read mode, RAM read pulses ER31 being developed in one pulse repetition period of the bit timing bits ER22. A ninth row show a train of reference clock pulses ER310 from which the RAM read pulses ER31 are prepared. The train of reference clock pulses ER310 is applied to the read address forming circuit 96 and the pulses ER31 are shown in FIG. 7 as being also applied to the shift register 82.

A positive rectangular pulse s1 shown in a tenth row is applied to a point P (see FIG. 7) or the set input to the first selector 76 while a negative rectangular pulse s2 shown in an eleventh row is applied to a point Q (see FIG. 7) or the set terminal of the second selector 78.

The lowmost row shows an output O from the third selector 80 developed on a lead e (see FIG. 7).

Figure 9B:
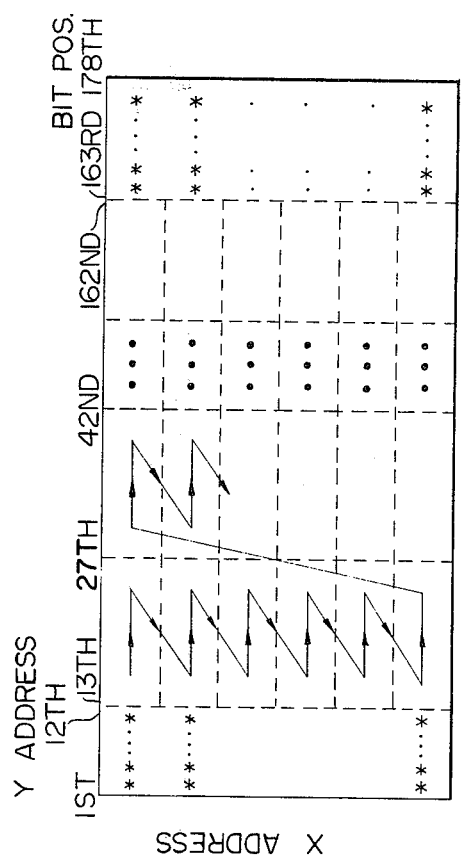
FIG. 9B is a diagram similar to FIG. 9A but illustrating a sequence in which data is written into the RAM device shown in FIG. 7.
Figure 9A:
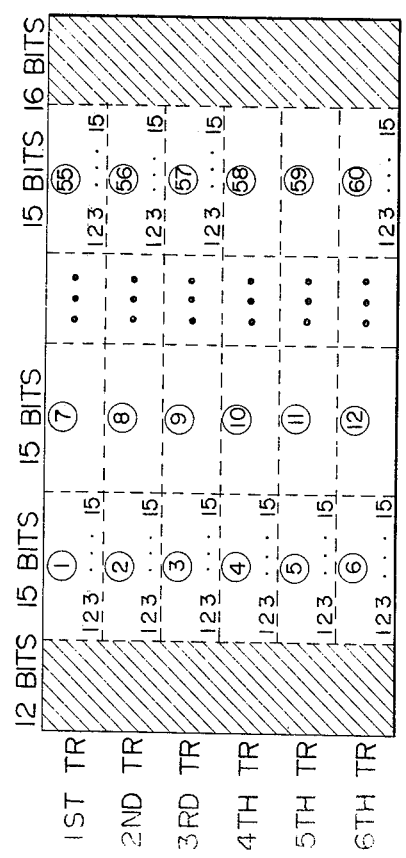
FIG. 9A is a schematic diagram illustrating a bit array forming a memory matrix stored in the RAM device shown in FIG. 7.
Figure 9C:
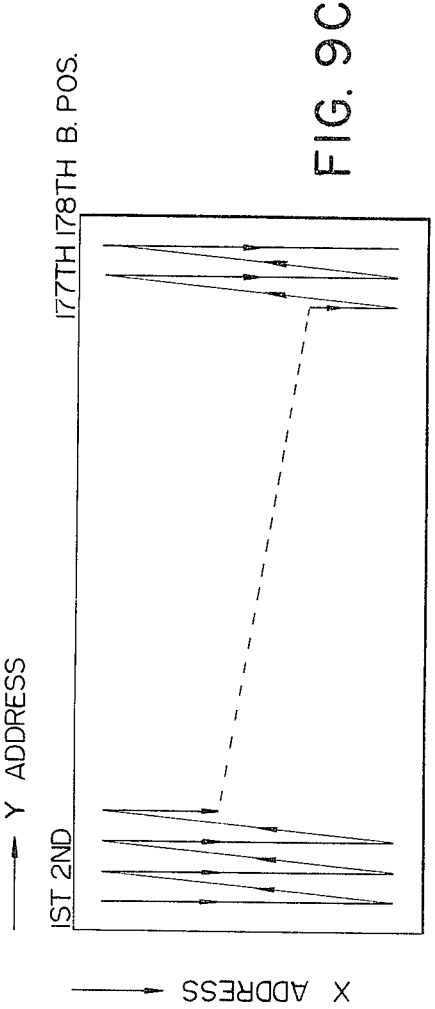
FIG. 9C is a diagram similar to FIG. 9A but illustrating a sequence in which data is read out from the RAM device shown in FIG. 7.

Referring back to FIG. 7, digital data from the input terminal 70 is entered into that RAM device 72 or 74 selected to be operated in the write cycle in response to the RAM write pulses ER13 and written at write addresses directed by the write address forming circuit 94 resulting in data being arranged as shown in FIG. 9A. The write addresses are alloted to $6 \times 150$ bit positions, one for each bit position, and for every particular sampling frequency e.g.-50.4 Khz, so that each group of 15 sampled bits are written at 15 bit positions continuously arranged in the row direction.

As shown in FIG. 9A, each RAM device 72 or 74 includes $6 \times 12$ and $6 \times 16$ bit positions disposed on the lefthand and righthand end portions respectively and an intermediate bit portion partitioned into ten sections, each including 15 columns. Both end portions are hatched and reserved for synchronizing patterns and check bits without information bits written therein because the timing pulses or signals can readily be prepared. The sampled information bits are written in the intermediate portion so that the 15 sampled bits forming the first row are successively written in the first section in the first row designated by the reference numeral 1 in a circle and then, 15 bits of the second group are successively written in the first section in the second row designated by the reference numeral 2 in a circle and so on until the sixth bit group is written in the first section in the sixth row designated by the reference numeral 6 in a circle.

Then, the writing process as described above is repeated with the second section of the intermediate portion and so on. When the last bit group is written in the last or tenth section in the sixth row designated by the reference numeral 60 in a circle, the writing process is completed. The bits written in each section in each row are designated by the reference ordinal numerals 1, 2, ..., 15.

The sequence in which the sampled bits are written in the RAM device is illustrated by the arrow in FIG. 9B. As shown in FIG. 9B, the arrow starts with the 13th bit position in the first row and reaches the 27th bit position in the same row. Then the arrow is returned back to the 13th bit position in the second row and goes to the 27th bit position in the same row and so on until the arrow reaches the 27th bit position in the sixth row. Thereafter the arrow depicts a zigzag path as described above between the 28th and 42th bit positions in the first through sixth rows and so on.

When one of the RAM devices, for example, the device 72, is operated in the write cycle, the other RAM device 74 is put in the read cycle of operation and read out from read addesses directed by the read address forming circuit 96 in response to the RAM read pulses ER31 by the third selector 80. As described above, the third selector 80 is always operated to read out the stored bits from that RAM device put in the read cycle of operation. The reading operation starts with a bit position lying in the first row and first column and goes to a bit position lying in the sixth row and first column after which the reading operation is repeated in the column direction with the succeeding columns. Finally, the 178th column is read out in the column direction.

The bits read out by the third selector 80 are in the form of separate trains of six bits O as shown in the last row of FIG. 8. In each pulse train, the reference numerals 1, 2, 3, ..., 60 in the circle designate serial numbers of samples rows and the reference numerals 1, 2, ..., 15 denoted below the circled reference numerals designate bit position in each sample.

It is noted that 6 bits designated by the reference numeral 1 follow by 6×12 dummy bits (not shown) and those designated by the reference numerals 60 are followed by 6×16 dummy bits (not shown) for the purpose as will be apparent later.

The trains of six bits O are serially supplied to the register 82 one after another and the register 82 provides parallel outputs to the transfer register 84 and then the output terminals 86 so as to distribute the outputs from the RAM device operated in the read cycle to the associated tracks on the magnetic tape.

In the reading operation, what is entered into those bit positions reserved for the synchronizing patterns and check bits is unknown. Such bit positions are designated by asterisks * in FIG. 9B. Data at the bit positions designated by asterisks are replaced by proper data in the later encoding steps.

The $C_2$ encoding adapting circuit 18 shown in FIG. 6A may be of a circuit configuration as shown in FIG. 10. In FIG. 10, each of six input terminals 102 is adapted to be connected to an associated one of the output terminals 86 shown in FIG. 7 and also to a series combination of one bit delay circuits 104, 106 and 108. Those delay circuits are formed of D FLIP-FLOP's applied with a train of clock pulses ET16 as will be described later. The delay circuits 104 are connected to respective output terminals 110 and the delay circuits 106 are connected to respective output terminals 112. Similarly the delay circuits 108 are connected to respective output terminals 114 and also to other output terminals 116 respectively which are connected to the $C_1$ encoders 22 (see FIG. 6) respectively. Three sets of the output terminals 110, 112 and 114 are connected to the $C_2$ encoder 20 as shown in FIG. 6A.

Data applied to each of the input terminals 102 is delayed in an incremental manner by one bit by the associated delay circuits 104, 106 and 108 the and data thus delayed is delivered to the mating output terminals 110, 112 and 114. More specifically, six bits delivered to the output terminals 114 comprise data just preceding the six bits delivered to the output terminals 112. Also, six bits delivered to the output terminals 112 comprise data just preceding the six bits delivered to the output terminals 110. Furthermore, six bits developed at the output terminals 116 are delayed by three bits as compared with those six bits applied to the input terminals 102.

In this way the data passed through the input terminals 102 can be entered into the $C_2$ encoder 20 for every three bits.

The $C_2$ encoder 20 and the $C_1$ encoder 22 may be of a circuit configuration shown in FIG. 11. In the arrangement illustrated, three sets of input terminals 120, 122 and 124 are connected to a first, a second and a third selector 126, 128 and 130 respectively and also adapted to be connected to the three sets of output terminals 110, 112 and 114 of the $C_2$ encoding adapting circuit 18 (see FIG. 10) respectively.

Each of the selectors 126, 128 or 130 selects successively the first through sixth rows or tracks in response to track selecting signals or pulses EG21, EG22, ..., EG26 successively applied thereto.

Each of those selectors 126, 128 and 130 includes an output connected to one input of an EXCLUSIVE OR gate 132 respectively. The outputs of the three EXCLUSIVE OR gates 132 are connected to three inputs of a 3 bit memory circuit 134 formed of three parallel MASTER-SLAVE or M-S FLIP-FLOP's, one for each bit. The memory circuit 134 includes a reset input R having reset pulses or signals ET21 applied thereto and a clock input CLK having timing pulses or signals ET22 appled thereto. The circuit 134 has three outputs connected to the other inputs of the EXCLUSIVE OR gates 132 and also connected to the three inputs of a 3 bit shift register 136 having timing signals ET23 and ET24 applied thereto.

Figure 11B:
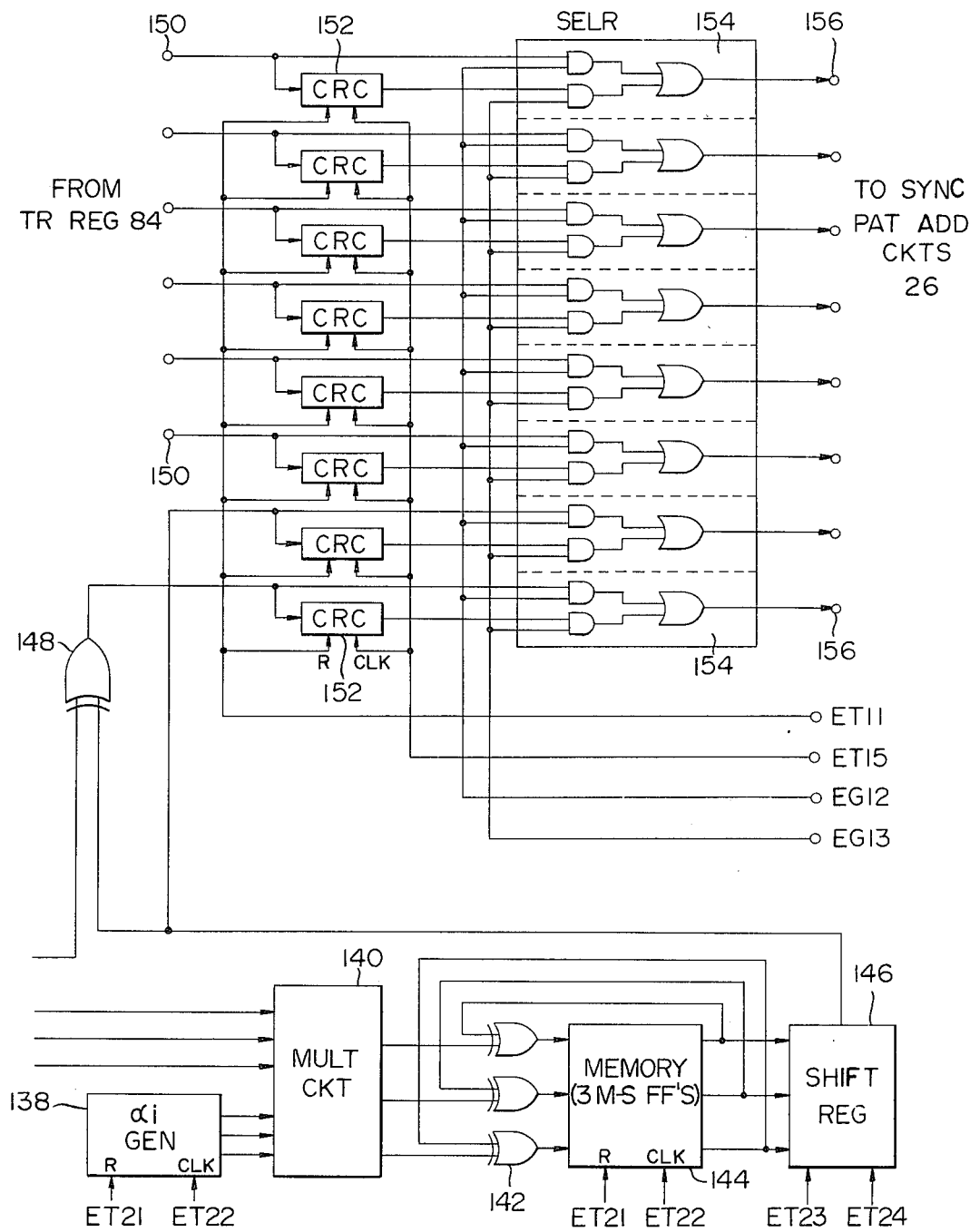

In FIG. 11B an $\alpha_i$ generator circuit 138 is shown as including a reset input R having the reset signals ET21 applied thereto and a clock input CLK having the timing signals ET22 applied thereto. The output of circuit 138 are connected to a multiplication circuit 140. The multiplication circuit 140 includes other inputs connected to the outputs of the selectors 124, 126 and 128. The $\alpha_i$ generator circuit 138 successively generates patterns $\alpha_1, \alpha_2, \ldots, \alpha_6$ corresponding to elements $\alpha_i$ of the Galois field $GE(2^3)$ in the order of the elements arranged in the first row on the righthand side of the expression (6) and the multiplication circuit 140 is operative to multiply information symbols $a_i(a_i \epsilon GF(2^3))$ for the code $C_2$ by the elements $\alpha_i$ of the Galois field $GF(2^3)$. The multiplication circuit 140 is formed of a read only memory device (which is abbreviated as an "ROM") having a capacity of $2^6 \times 3$ bits into which the results of the multiplication has been preliminarily written.

The multiplication circuit 140 includes three outputs connected to a series combination of three parallel EXCLUSIVE OR gates 142, a memory circuit 144 and a 3 bit shift register 146 identical to the components 132, 134 and respectively and interconnected in the same manner as the latter elements 132, 134 and 136. The shift registers 136 and 146 are connected to a pair of inputs, of an EXCLUSIVE OR gate 148.

A set of input terminals 150 are adapted to be connected to the output terminals of the $C_2$ encoding adapting circuit shown in FIG. 10. Those input terminals 150 are connected to respective $C_1$ encoders 152 labelled CRC which produce cyclic redundancy check bits and may be commercially available under the designation. Type 9401 IC from the Fairchild Semiconductor Corporation. Each of the $C_1$ encoders 152 includes a reset input R and a clock input CLK which receive reset pulses ET11 and clock pulses ET15 respectively and an output connected to one input of an AND gate whose other input receives check write enable pulses ET13. Each of the input terminals 150 is also connected to one input of another AND gate whose other input receives information write enable pulses EG12. Then, the outputs of the two AND gates are connected to a pair of inputs of an OR gate to form a selector 154. The selector 154 selects either an information bit portion or a check bit portion in response to the write enable signal EG12 or EG13 respectively. The selected bit portion is delivered to an output terminal 156 connected to the OR gate output.

The shift registor 146 is also connected to a series combination of a $C_1$ encoder 152 and a selector 154 identical to the selector 152 as described above. Also the EXCLUSIVE OR gate 148 includes an output connected to a series combination of a $C_1$ encoder and a selector identical to those described above. The last-mentioned two selectors are connected to different output terminals 156 respectively.

Figure 12:
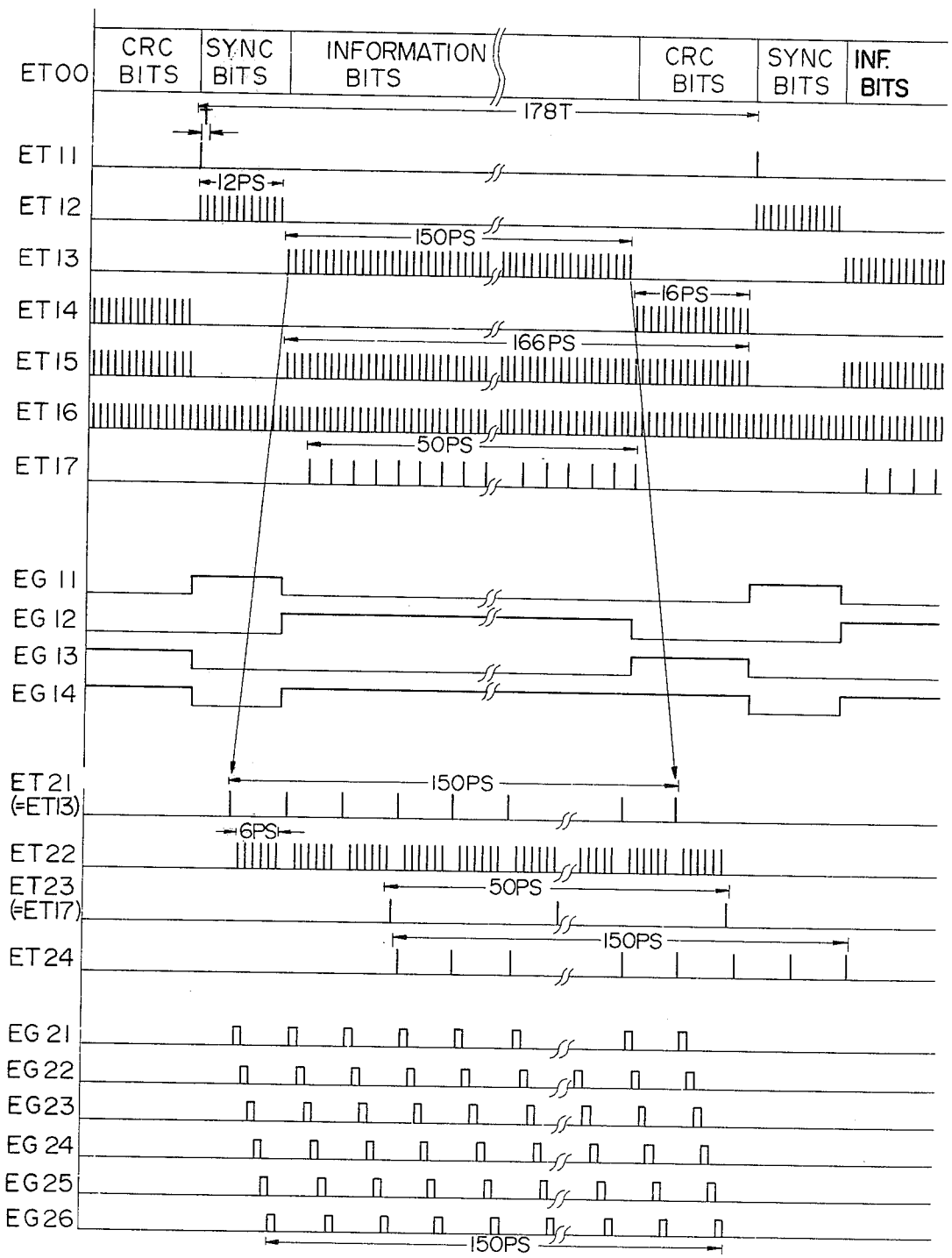
FIG. 12 is a timing chart illustrating timing signals applied to the arrangements shown in FIGS. 10 and 11.

The pulses and signals described in conjunction with FIG. 11 are illustrated in FIG. 12 with associated other timing signals.

In FIG. 12, the first row shows one bit frame and one portion of the adjacent frames after having been coded. As shown, the bit frame is designated by the reference characters and numeral ET00 and composed of a synchronizing pattern including 12 synchronizing bits, digital information including 150 bits, and 16 CRC bits contiguous to one another in the named order. Therefore, the bit frame totals 178 bits.

The second row shows a block timing signal ET11 identical to the block timing pulses ER11 shown in FIG. 8. The timing signal ET11 is developed at each partition between adjacent rectangular arrays such as shown in FIG. 5 and has a pulse repetition period equal to 178 times the duration thereof. The third row shows a train of 12 write timing pulses ET12 for the synchronizing pattern including a first pulse rising simultaneously with the block timing signal ET11 and is followed by a train of 150 write timing pulses ET13, shown in the fourth row, to write information bits of codes $C_1$. Then, a train of 16 write timing pulse ET14 for check bits, shown in the fifth row, follows the pulse train ET13 which is followed by the next succeeding timing signal ET11. The sixth row shows a train of 166 pulses ET15 for writing bits included in each frame except for the synchronizing pulses, that is to say, codewords of the code $C_1$. A pulse train ET16, shown in the seventh row, includes 178 bit timing pulses developed during each frame. The pulse trains ET12 through ET16 have a common pulse repetition period.

The eighth row shows a train of 50 shifting pulses ET17 which is also shown in the fifteenth row as a train of 50 shifting pulses ET23. The pulses ET17 or ET23 are applied to the shift registers 136 and 146 to cause the latter to effect one logic operation with an incremental time delay corresponding to every three continuous bits.

The ninth row shows a write enable rectangular pulse EG11 for the synchronizing pattern rising simultaneously with the first pulse of the pulse train ET12 and falling substantially simultaneously with the first pulse of the pulse train ET13. When the rectangular pulse EG11 is a binary ONE as illustrated, the 12 synchronizing pulses ET12 are enabled to enter a synchronizing pattern into an associated frame. The tenth row shows a write enable rectangular pulse EG12 for information bits of the code $C_1$ rising simultaneously with the fall of the rectangular pulses EG11. When the rectangular pulse EG12 is a binary ONE, the 150 bit write pulses ET13 are enabled to enter the information bits of the code $C_1$ into the frame after which the pulse EG12 falls. The elevated row shows a write enable rectangular pulse EG13 for the check bits rising simultaneously with the fall of the pulse EG12 and falling simultaneously with the end of each frame. When the pulse EG13 is a binary ONE, the 16 check pulses ET14 are enabled to enter the check bits for the code $C_1$ into the frame. The twelfth row shows a write enable rectangular pulse EG14 for codewords of the code $C_1$ rising simultaneously with the fall of the pulse EG11 and falling at the end of each frame. When the write enable pulse EG14 is a binary ONE, the 166 pulses ET15 are enabled to enter the codewords of the code $C_1$ including 166 bits into the frame.

The thirteenth row shows the pulse train ET21, which is a replica of the pulse train ET13, illustrated in an extended time base and applied to the memory circuits 134 and 144 and the $\alpha_i$ generator circuit 138 (see FIG. 11) as reset pulses. The fourteenth row shows a pulse train ET22 applied to the clock input to the memory circuits 134 and 144 and the $\alpha_i$ generator circuit 138 (see FIG. 11). As shown, the pulse train ET22 includes 6 pulses developed at equal time intervals for one pulse repetition period of the bit timing pulses ET13. A pulse train ET23 shown in the fifteenth row is a replica of the train of shifting pulses ET17 illustrated in an extended time base. A train of 150 pulses ET24 shown in the sixteenth row serves to shift 3 bit check symbols one bit by one bit.

The seventeenth row et seq show trains of 150 track selecting pulses EG21 through EG26 applied to the selectors 120, 122 and 124 (see FIG. 11) to successively select bits on the first through sixth rows corresponding to the first through sixth tracks on the magnetic tape. Each of the pulse trains has a common pulse repetition period and includes pulses rising simultaneously with the fall of adjacent pulses of the just preceding pulse train.

The encoding algorithm effected by the arrangements shown in FIGS. 7, 10 and 11 will now be briefly described.

First, 6×150 bit original information is divided or grouped into 50 rectangular arrays each including 6×3 bits.

Then, a rectangular array of 1×3 bits is regarded as a symbol corresponding to the element of the Galois field $GE(2^3)$ in the 6×3 bit rectangular array. Two check symbols are added to the 6×3 bit rectangular array in accordance with an encoding algorithm for (8,6) Reed-Solomon codes over the Galois field $GF(2^3)$ whereby the rectangular array is encoded into eight symbols resulting in a rectangular array including 8×3 bits.

The process as just described is executed 50 times to form a rectangular array including 8×150 bits.

Subsequently, 16 check bits are added to 150 bit arranged in the row direction or the direction of travel of the tracks in accordance with an encoding algorithm for (166, 150) CRC codes over the Galois field GF(2) resulting in the encoding thereof into 166 bits.

After this encoding has been effected eight times, a rectangular array of 8×166 bits are made up as a codeword of a G.P. code.

A parity check matrix for the (8,6) Reed-Solomon code over GF($2^3$) may be expressed by $$H = \begin{bmatrix} \alpha_1 & \alpha_2 & \alpha_3 & \alpha_4 & \alpha_5 & \alpha_6 & 1 & 0 \\ 1 & 1 & 1 & 1 & 1 & 1 & 1 & 1 \end{bmatrix} \quad (6)$$

where $\alpha_1, \alpha_2, \ldots, \alpha_6$ designate the elements of GF($2^3$) except for zero (0) and unity (1) and are given by rearranging properly $\alpha, \alpha^2, \ldots, \alpha^6$. For example, the elements may be selected such that $\alpha_1=\alpha^5$, $\alpha_2=\alpha^4$, $\alpha_3=\alpha^6$, $\alpha_4=\alpha^2$, $\alpha_5=\alpha^3$ and $\alpha_6=\alpha$. In this case, the $\alpha_i$ generator circuit 138 shown in FIG. 11 and also described later may be formed of a down counter.

The element $\alpha$ is the primitive element of GF($2^3$) and satisfies $\alpha^3+\alpha+1=0$ on the assumption that the calculation is effected over GF($2^3$).

FIG. 13 illustrates the correspondency of the elements of GF($2^3$) and coefficients $\alpha^2$, $\alpha^1$ and $\alpha^0$ in the binary form.

Assuming that $a_1, a_2, \ldots, a_6$ designate information symbols of the Reed-Solomon code, check symbols $a_7$ and $a_8$ may be expressed by $$a_7 = \sum_{i=1}^{6} a_i \alpha_i \quad (7)$$

and $$a_8 = \sum_{i=1}^{6} a_i + a_7 \quad (8)$$

where the calculation is effected over GF($2^3$).

Referring back to FIG. 11, the arrangement illustrated will now be described in conjunction with the encoding process as described above. The 6×3 bit information is applied to the selectors 126, 128 and 130 through the sets of input terminals 120, 122 and 124 respectively, and those selectors respond to the row selecting pulses EG21, EG22 ..., EG26 to pick up three bits successively and in a parallel relationship from the first through sixth rows or tracks. Every 3 bit information group thus selected passes through the EXCLUSIVE OR gates 132 to the memory circuit 134 formed of the three M-S FLIP-FLOP's where the continued sum is formed under the control of the pulses ET21 or ET13 and ET22. After having been thereby added with the information symbols $a_1, a_2, \ldots, a_6$, the shift register 136 has registered therein $$\sum_{i=1}^{6} a_i$$

appearing on the righthand side of the expression (8) under the control of the pulses ET23 and ET24.

The $\alpha_i$ generator circuit 138 having the pulses ET21 and ET22 applied thereto successively generates patterns $\alpha_1, \alpha_2, \ldots, \alpha_6$ corresponding to the elements of the Galois field GF($2^3$) in the order shown in the first row of the righthand side of the expression (6). This generation of the patterns can be typically realized by preliminarily writing the patterns corresponding to $\alpha_1, \alpha_2, \ldots, \alpha_6$ in 6×3 bit memory means one after another and successively reading out them from the latter for multiplication.

Alternatively, $\alpha_1, \alpha_2, \ldots, \alpha_6$ may be generated by a down counter circuit formed of a 3 bit binary counter. This is because it is only necessary to successively generate 3 bit patterns which are different from one another.

Figure 14:
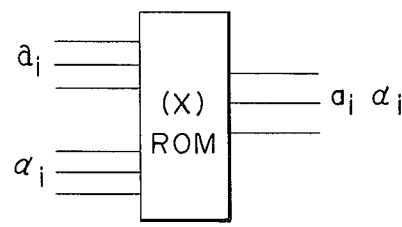
FIG. 14 is a block diagram of a multiplier over the Galois field $GF(2^3)$ formed of a ROM device and a table illustrating addresses of the ROM device and data stored thereat.

The patterns thus generated are successively applied to the multiplication circuit 140. In the example illustrated, the multiplication circuit 140 is formed of a $2^6 \times 3$ bit ROM device including six inputs and supplied with input patterns $\alpha_i$ and $a_i$ respectively and three outputs from which an output $a_i \alpha_i$ is delivered as shown on the upper portion of FIG. 14. In the ROM device the input patterns $a_i$ and $\alpha_i$ are regarded as addresses and output patterns corresponding thereto are preliminarily written. For example, if $a_i$ is expressed by (010), or if $\alpha_i$ is of (011) corresponding to $\alpha^3$ then an associated output pattern is expressed by $a_i \alpha_i = \alpha \alpha^3 = \alpha^4$. From FIG. 13 it is seen that a corresponding output pattern is expressed by (110). Accordingly, three bits indicating $a_i$ along with three bits indicating $\alpha_i$ define respective addresses and the contents of the addresses may be selectively read out as the products of $a_i$ and $\alpha_i$. FIG. 14 also shows on the lower portion thereof a table illustrating addresses ($\alpha_i$, $a_i$) and the corresponding ROM contents.

From the foregoing it will readily be understood that a division circuit as will be described later may be similarly formed as the multiplication circuit 140.

Then, 3 bit products $a_i \alpha_i$ from the multiplication circuit 140 are applied via the three EXCLUSIVE OR gates 142 to the memory circuit 144 where a continued addition is effected as in the memory circuit 134. After the addition has been effected six times in the memory circuit 144, a pattern corresponding to $a_7$ is registered in the shift register 146 operated in the same manner as the shift register 136. Then the $a_7$ pattern registered in the shift register 146 passes through that selector 154 connected to the output of the shift register 146 and is developed at an associated one of the output terminals 156.

On the other hand $$\sum_{i=1}^{6} a_i$$

registered in the shift register 136 and the $a_7$ pattern or value registered in the shift register 146 are applied to the EXCLUSIVE OR gate 148 where they are added to each other in one bit correspondence to form a 3 bit $a_8$ pattern. This 3 bit $a_8$ pattern is supplied to that selector 154 connected to the output of the EXCLUSIVE OR gate 148 and then developed at an associated one of the output terminals 156.

Thus 6×3 bit data groups $a_1, a_2, a_3, a_4, a_5$ and $a_6$ are added with check symbols $a_7$ and $a_8$.

The process as described above is repeated 50 times following the timing pulses or signals ET23 shown in FIG. 12.

Each of the $C_1$ encoders 152 connected to the respective input terminals 150 generates 16 check bits with respect to the 150 bit information group arranged in the associated row of the rectangular array. Also, the $C_1$ encoder 152 connected to the output of the shift register 146 generates 16 check bits by regarding the 50 check symbols $a_7$ from the $C_2$ encoder as a 150 bit data group. Similarly, the $C_1$ encoder 152 connected to the output of the EXCLUSIVE OR gate 148 generates 16 check bits by regarding the 50 check symbols $a_8$ from the $C_2$ encoder as a 150 bit data group.

After each of the selectors 154 has delivered a 150 bit data group to the mating output terminal 154 under the control of the pulses EG12 (see FIG. 12) the same is applied with the pulses EG13 (see FIG. 12) but not with the pulses EG12 to deliver the associated 16 check bits to the mating output terminal 156.

A codeword of $8 \times 166$ bits thus formed is entered into the synchronizing pattern addition circuits 26 (see FIG. 6A) through the output terminals 156. In the synchronizing pattern addition circuits 26, a synchronizing pattern in the form of a rectangular array and including $8 \times 12$ bits is added to each codeword to form a rectangular array of $8 \times 178$ bits.

The $8 \times 178$ bit rectangular array is passed through the modulation circuits 28 and is then recorded on the magnetic tape 32 by the recording heads 30 as shown in FIG. 6A.

DETAILS OF DECODING UNIT

Then as shown in FIG. 6B, the $8 \times 178$ bit rectangular array or the signal recorded on the magnetic tape 32 is reproduced by the reproducing heads 34 and successively processed by the demodulation circuits 36, the synchronizing pattern detection circuits 38 and the TBC circuits 40. As a result, a received word, including $8 \times 166$ bits, is reproduced. The received word corresponds to a codeword of a G.P. code and enters the $C_Z$ decoder 42.

Figure 15:
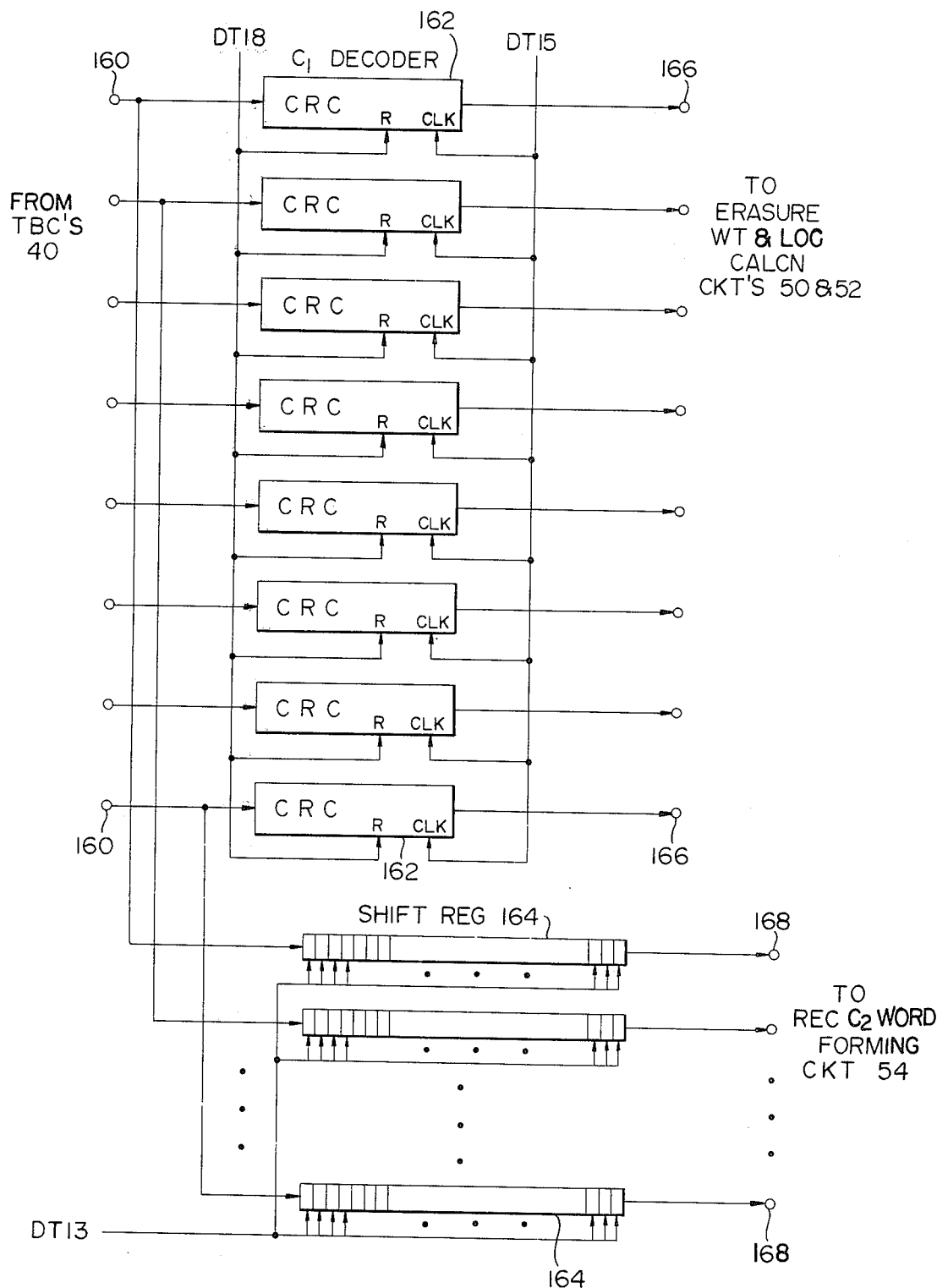
FIG. 15 is a block diagram of the $C_1$ decoder shown in FIG. 6B.

FIG. 15 shows the details of the $C_1$ decoders 44 included in the $C_Z$ decoder 42. In the arrangement illustrated, a set of input terminals 160, in this case, eight terminals adapted to be connected to the T.B.C. circuits 40 respectively, are connected to respective $C_1$ decoders 162, labelled "CRC" and also to respective shift registers 164, each register including 150 bit positions and forming a delay circuit controlled with pulses DT13. Each of the $C_1$ decoders includes a reset input R having reset pulses DT18 applied thereto, a clock input CLK having clock pulses DT15 applied thereto, and an output connected to a different one of eight output terminals 166. Those output terminals 166 are connected to the erasure weight and location calculation circuits 50 and 52 respectively (see FIG. 6B). The shift registers 164 outputs are connected to respective output terminals 168 adapted to be connected to the received word forming circuit 54 for codes $C_2$ (see FIG. 6B).

The received word with 166 bits corresponding to the codeword of the code $C_1$ is applied to the each of the input terminals 160 and then entered into the associated $C_1$ decoder 162 which detects if an error occurs in the codeword. When the codeword is erroneous, as determined thereby, the associated $C_1$ decoder 162 delivers a binary ONE to the mating output terminal 166 of the erasure weight and location circuits. Otherwise, it delivers a binary ZERO to that output terminal 166.

Simultaneously with the error detection effected by the $C_1$ decoders 162, 150 bit data groups are supplied to each of the output terminals 168 through the mating delay circuit 164. The delay circuit 164 includes 150 bit positions and is operative to delay data applied by one codeword of a G.P. code until the associated $C_1$ decoder 162 has been completed to effect the error detection. This is because information concerning the detected error is utilized as an erasure upon the decoding by the $C_2$ decoder.

Figure 16:
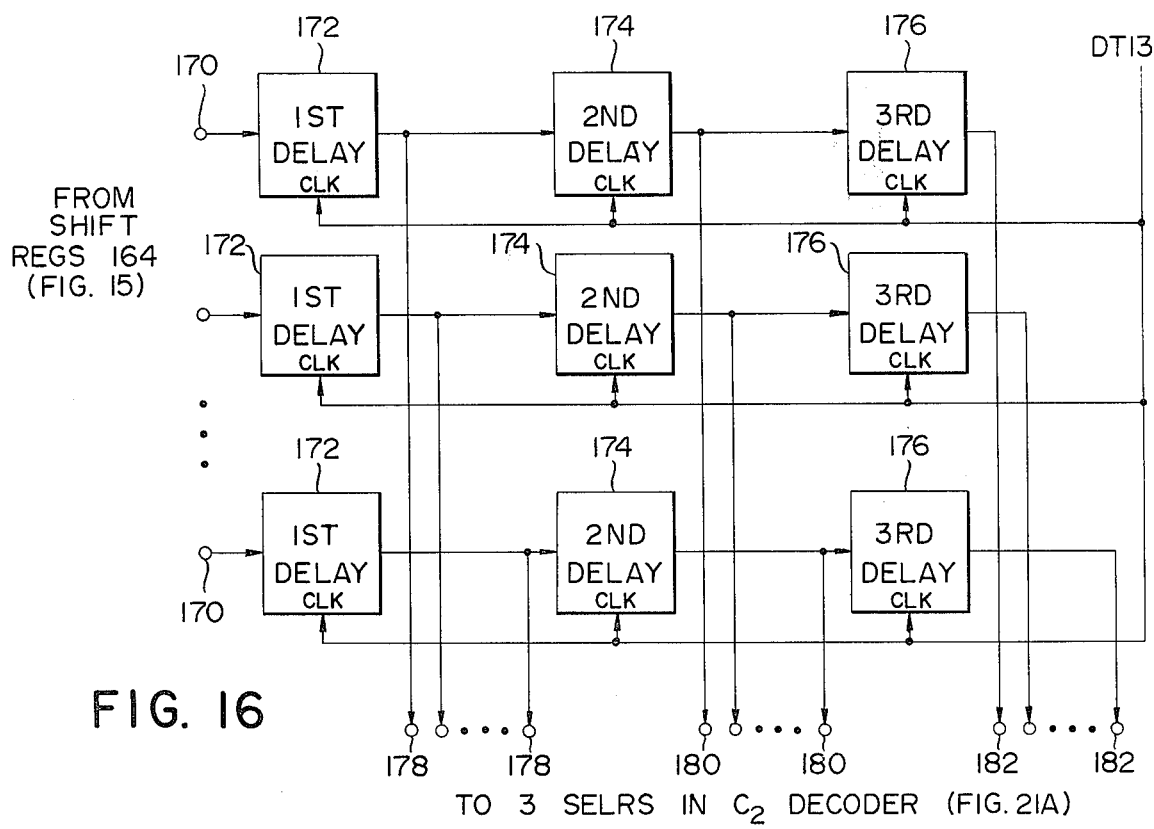
FIG. 16 is a block diagram of the received word forming circuit for codes $C_2$ shown in FIG. 6B.

FIG. 16 shows the details of the received word-of-code $C_2$ forming circuit 54. In the arrangement illustrated, output terminals 168 are adapted to be connected to the received word-forming circuit $54_A$ of code $C_2$ whose details are shown in FIG. 16.

A set of input terminals 170 is adapted to be connected to the output terminals 168 of the shift registers 164 respectively. Each of the input terminals 170 is connected to a first delay circuit 172 subsequently connected to a second delay circuit 174 which is, in turn, connected to a third delay circuit 176. Each of the delay circuits 172, 174 or 176 is formed of a D FLIP-FLOP including a clock input CLK having clock pulses DT13 applied thereto and imparting a time delay corresponding to one bit of an input applied thereto.

All the first delay circuits 172, are connected to a first set of output terminals 178, respectively and the second delay circuits 174 are connected to a second set of output terminals 180. Similarly, the third delay circuits 176 are connected to a third set of output terminal 182. In this case, each set of terminals includes eight output terminals and is connected to selectors connected to different ones of selectors disposed in the $C_2$ decoder 56 (see FIG. 6B).

Data is applied to the input terminals 170 in an incremental manner by one bit by means of the serially connected delay circuits 172, 174 and 176. Therefore, the eight bits developed at the eight output terminals 182 comprise data temporarily preceding those developed at the eight output terminals 180 by one bit and the eight bits developed at the output terminals 180 comprise data temporarily preceding those developed at the output terminals 178 by one bit.

From the foregoing, it is seen that data transmitted along eight channels are partitioned into groups, each including three bits, to form the received words of the code $C_2$, each arranged in a rectangular array including $8 \times 3$ bits. The received words of the code $C_2$ thus formed are successively delivered to the $C_2$ decoder 56.

Figure 17:
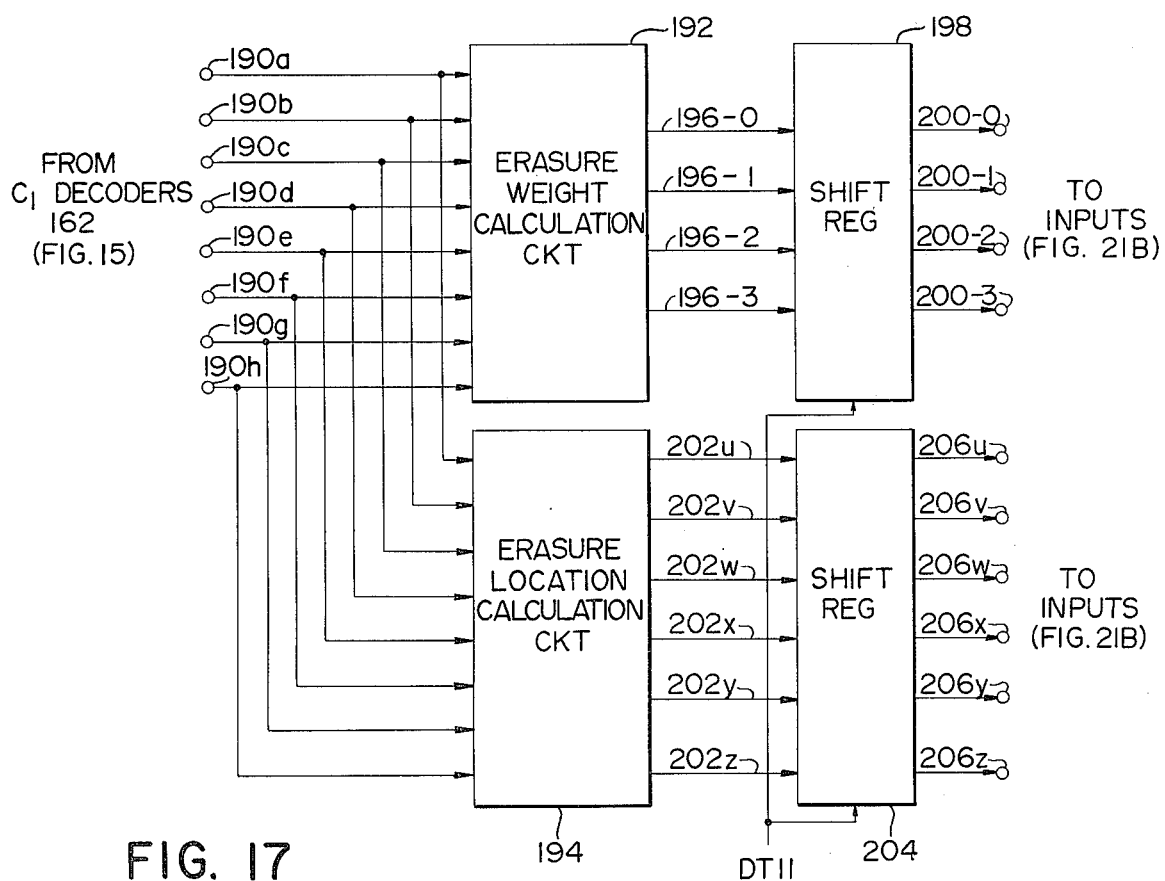
FIG. 17 is a block diagram of the erasure weight and location calculation circuits shown in FIG. 6B.

In the erasure weight and location calculation circuits shown in FIG. 17, error detected data from the $C_1$ decoders 162 shown in FIG. 15 is applied to a set of input terminals 190a, 190b, 190c, 190d, 190e, 190f and 190h. When any of the $C_1$ decoders 162 detects an error, a binary ONE is applied to an associated one of those input terminals. Otherwise, that input terminal receives a binary ZERO.

Those eight input terminals 190 are connected to both the erasure weight calculation circuit designated here by the reference numeral 192 and the erasure location calculation circuit designated here by the reference numeral 194. The erasure weight calculation circuit 192 is connected via four leads 196-0, 196-1, 196-2 and 196-3 to a shift registor 198 which is subsequently connected to four output terminals 200-0, 200-1, 200-2 and 200-3. The shift register 198, including a set input having set pulses DT11 applied thereto is formed of D FLIP-FLOP's and operative to register therein erasure weight information until one codeword of a G.P. code is decoded.

The erasure location calculation circuit 194 is connected via six leads 202u, 202v, 202w, 202x, 202y and 202z to a shift register 204 which is similar to the shift register 198. The shift register 204 is connected to six output terminals 206u, 206v, 206w, 206x, 206y and 206z. The shift register 204 registers therein erasure location information until one codeword of the G.P. code is decoded.

When no error is detected in any one of the rows of the rectangular array or the tracks, or when no erroneous track is detected, a binary ONE is developed on the lead 196-0 and then at the output terminal 200-0. When an error is detected on a single one of the tracks or when a single erroneous track is detected, a binary ONE is developed on the lead 196-1 and then at the output terminal 200-1. Also, when errors are detected on two tracks, or when two erroneous tracks are detected, a binary ONE is developed on the lead 196-2 and then at the output terminal 200-2. Similarly when errors are detected on not less than two tracks or when not less than two erroneous tracks are detected, a binary ONE is developed on the lead 196-3 and then at the output terminal 200-3.

Error location information $\alpha_i$ is developed on the leads 202u, 202v and 202w and then at the output terminals 206u, 206v and 206w while error location information $\alpha_j$ is developed on the leads 202x, 202y and 202z and then at the output terminals 206x, 206y and 206z where i and j are integers and where $1 \leq i < j \leq 8$. Each of i and j designates a serial number of the eight tracks and is in the form of a binary number including three bits. In the example illustrated, each of the i and j may be a binary number of (111), (110), (101), (100), (011), (010), (001) or (000) identifying the first, second, third, fourth, fifth, sixth, seventh or eighth track respectively, as will be seen in the first row of the righthand side of the expression (6).

When no erroneous track is detected, each of $\alpha_i$ and $\alpha_j$ is a binary ZERO which is developed on each set of the output terminals 206u, 206v, 206w and 206x, 206y, 206z. When a single erroneous track is detected, $\alpha_i$ indicates that track having an error detected while $\alpha_j$ is always of binary ZERO. When two erroneous tracks are detected, $\alpha_i$ designates that track including the error and having the smaller serial number while $\alpha_j$ designates that track having the larger serial number and including the error. However when more than two erroneous tracks are detected, the values of $\alpha_i$ and $\alpha_j$ are not defined.

The erasure weight calculation circuit 192 may be formed of a parallel in-serial out 8 bit shift register, three 3 bit binary counters and a counter decoding circuit. Alternatively, the circuit 192 may be formed of a $2^8 \times 4$ bit ROM device. In the latter case, binary numbers, each including four bits, are preliminarily written in the device so that the content stored at each of the addresses as determined by binary patterns applied to the inputs to the device, determines which of the leads 196-0, 196-1, 196-2 and 196-3 delivers an output, by the number of binary ONE's included in the content.

The erasure location calculation circuit 194 may be formed of a $2^8 \times 6$ bit ROM device having binary patterns applied to and delivered from the same as shown, by way of example, in FIG. 18. In the table illustrated, the lefthand column as viewed in FIG. 18 includes 8 bit binary numbers applied to the input terminals 190a through 190h (see FIG. 17). That column is divided into eight sub-columns labelled a, b, c, d, e, f, g and h having disposed therein binary ZERO's or ONE's which are applied to the input terminals 190 suffixed with the same reference characters as the sub-columns.

An intermediate column designated by $\alpha_j$ is divided into three sub-columns x, y and z having arranged therein binary ZERO's and ONE's developed on the lead 202 suffixed with the same reference characters as the sub-columns. Similarly, the righthand column $\alpha_i$ as viewed in FIG. 18 illustrates binary outputs developed on the leads 202u, 202v and 202w.

Furthermore, a first row labelled A shows the input and output patterns formed when no erroneous track is detected and the succeeding eight rows, labelled B, show the input and output patterns selectively formed when a single erroneous track is detected. The last twenty-eight rows, labelled C, show the input and output patterns selectively formed upon the detection of two erroneous tracks.

In the ROM device it is necessary to deliver only two binary patterns, each including three bits, for each input pattern including eight bits. Therefore, the ROM device can be realized by having 6 bit contents preliminarily wirtten thereinto at addresses defined by 8 bit input patterns.

Alternatively, the erasure location calculation circuit may be formed of gate circuits so that, with respect to eight inputs a, b, c, d, e, f, g and h, logic expressions for outputs x, y, z, u, v and w are obtained by regarding the intact input and output patterns shown in FIG. 18 as the truth table thereof.

Alternatively, the erasure location calculation circuit 194 may be formed of gate circuits. In this case, logic expressions for the output x, y, z, u, v and w may be deduced as functions of the inputs a, b, c, d, e, f, g and h so as to hold the truth table expressed by the input and output patterns shown in FIG. 18.

Figure 19:
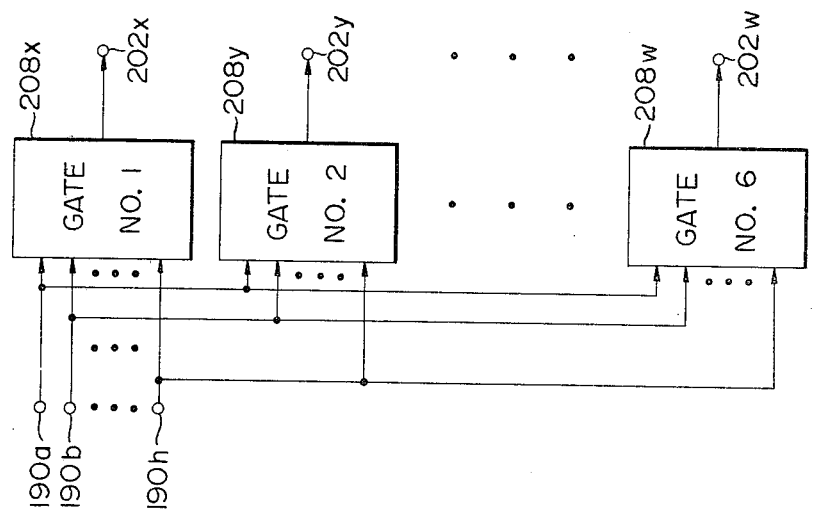
FIG. 19 is a block diagram of the erasure location calculation circuit shown in FIG. 17 and formed of gate circuits.

In the example illustrated, the erasure location calculation circuit 194 is typically formed of six gate circuits as shown in FIG. 19. In the arrangement illustrated, the eight input terminals 190a through 190h shown in FIG. 17 are connected in a parallel circuit relationship to six gate circuits 208x, 208y, 208z, 208u, 208v and 208w subsequently connected to the leads 202x, 202y, 202z, 202u, 202v and 202w (see FIG. 17) respectively.

It is assumed that a, b, c, d, e, f, g and h designate input signals applied to the input terminals 190a, 190b, 190c, 190d, 190e, 190f, 190g and 190h respectively and x, y, z, u, v and w designate output signals developed on the leads 202x, 202y, 202z, 202u, 202v and 202w respectively.

It will readily be understood that the gate circuits 208x through 208w can be constructed by following the logic expressions for deriving the output signals x, y, z, u, v and w from the input signals a, b, c, d, e, f, g and h respectively.

For example, the construction of the gate circuit 208x will now be described. FIG. 18 illustrate six output patterns including the output signal x having a value of binary ONE. Therefore x may be expressed by the logic expression:

$$x = \overline{efgh}(ab\overline{cd} + a\overline{b}cd + a\overline{bc}d + \overline{a}bcd + \overline{a}b\overline{c}d + \overline{ab}cd) \quad (9)$$

$$= \overline{efgh}\{(a \oplus b)\overline{cd} + (a \oplus b)\overline{c}d + ab\overline{cd} + \overline{ab}cd\}$$

Figure 20:
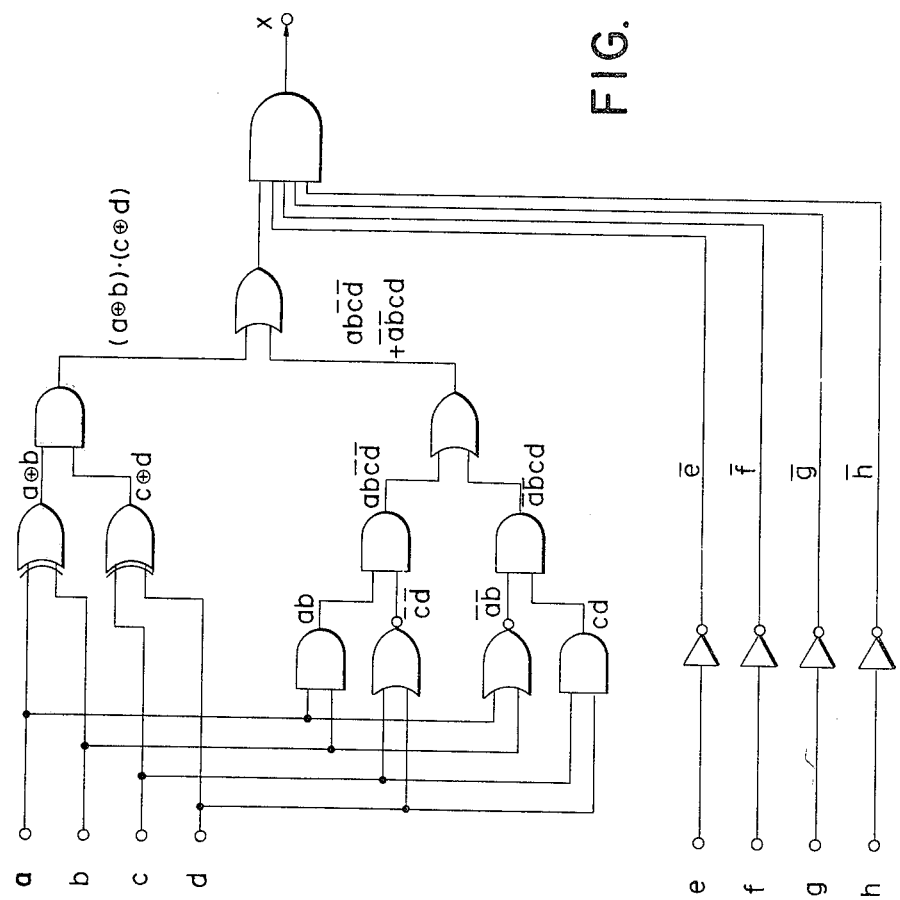
FIG. 20 is a block diagram of one of the gate circuits shown in FIG. 19.

-continued $$= \overline{efgh} \{(a \oplus b)(c \oplus d) + (a\overline{bcd} + \overline{a}bcd)\}$$

where the symbol + designates the "OR" operation and ⊕ designates the "EXCLUSIVE OR" operation. It will readily be understood that the expression (9) can be realized by AND, OR, EXCLUSIVE OR, and inverter gates connected as shown in FIG. 20 with output signals denoted beside the outputs of various gates.

The foregoing is equally applicable to the remaining gate circuits shown in FIG. 17.

Figure 21A:
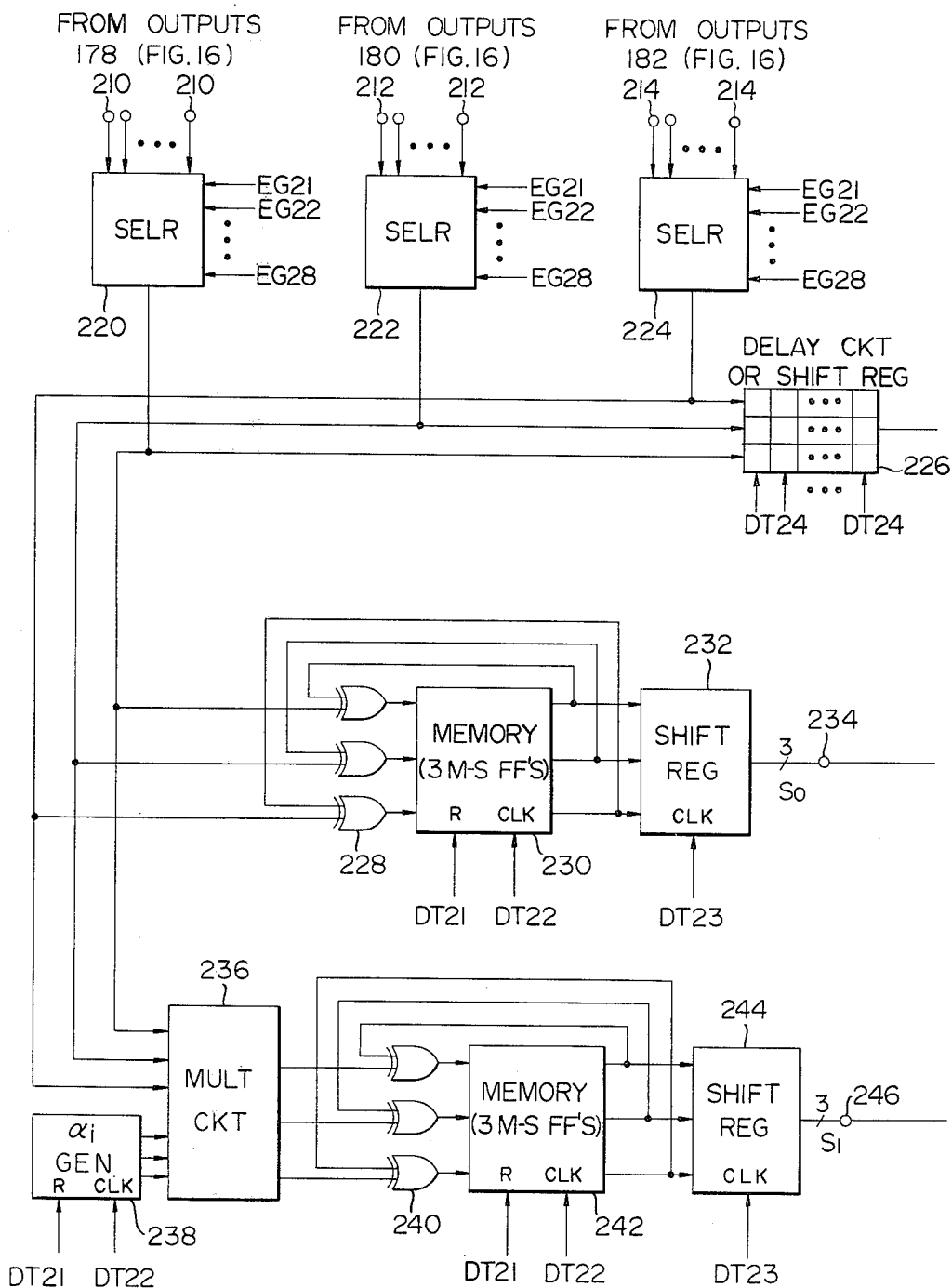
FIGS. 21A and 21B in combination is a block diagram of the $C_2$ decoder shown in FIG. 6B.
Figure 21C:
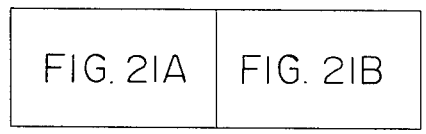
FIG. 21C is the arrangement of FIGS. 21A and 21B.
Figure 21B:
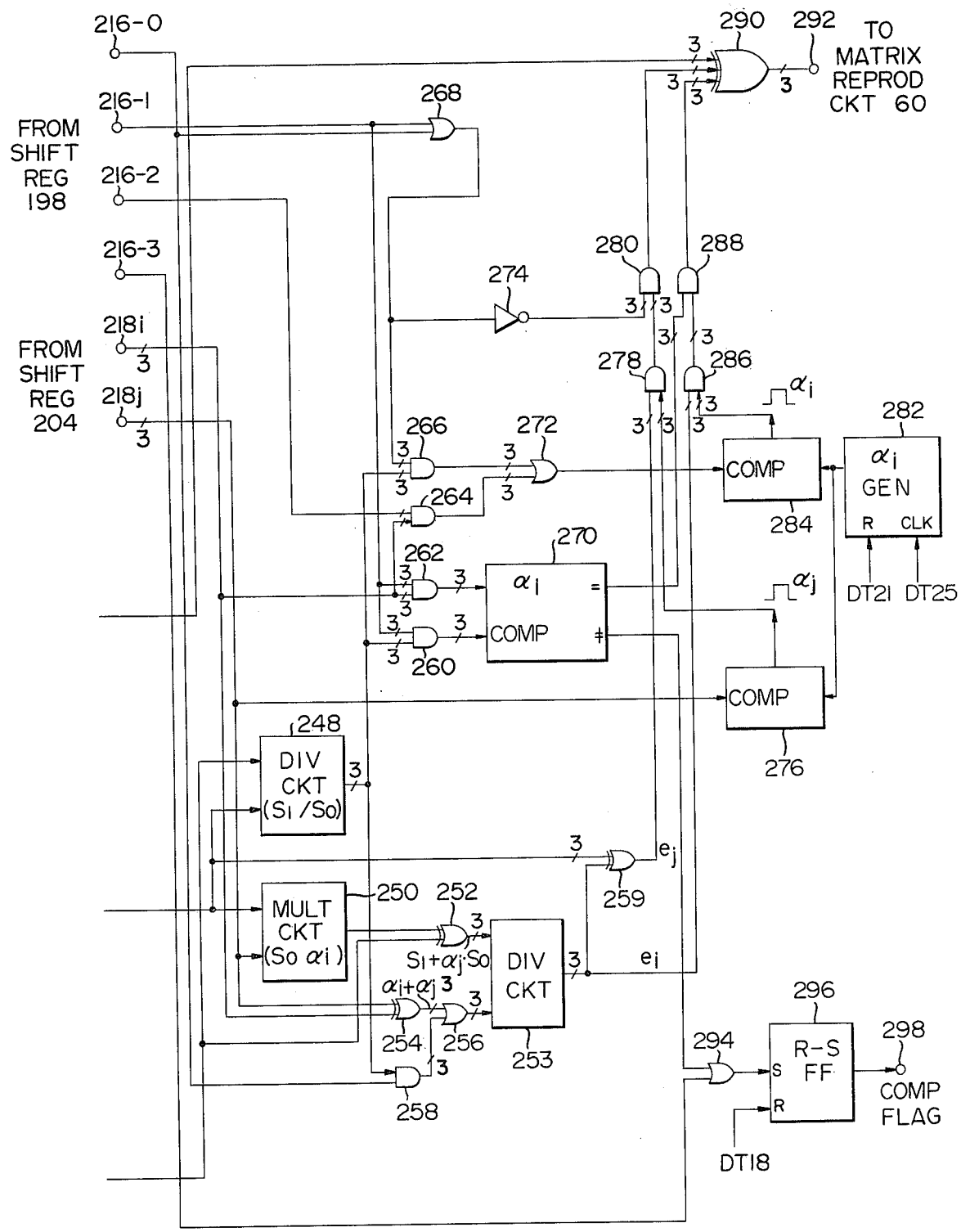

The $C_2$ decoder 56 shown in FIG. 6 is of a circuit configuration as illustrated in FIGS. 21A and 21B. In the arrangement illustrated, three sets of input terminals 210, 212 and 214 are adapted to be connected to the sets of the output terminals 178, 180 and 182 of the received word forming circuit 54 for the code $C_2$ shown in FIG. 16 respectively. In the example illustrated, each set includes eight output terminals. Also four input terminals 216-0, 216-1, 216-2 and 216-3 are adapted to receive respective outputs from the output terminals 200-0, 200-1, 200-2 and 200-3 of the erasure weight calculation circuit 192 (see FIG. 17). As will readily be understood from the description for FIG. 17, the input terminals 216-0, 216-1, 216-2 and 216-3 have applied thereto data concerning the detection of no erroneous track, the detection of a single erroneous track, the detection of two erroneous tracks and the detection of not less than three erroneous tracks respectively.

Further each of two input terminals 218*i* or 218*j* is adapted to be connected to the three output terminals 206*u*, 206*v* and 206*w* or 206*x*, 206*y* and 206*z* of the erasure location calculation circuit 194 (see FIG. 17). Therefore, the input terminals 218 are representative of three input terminals adapted to be connected to those three output terminals of the erasure location circuit 194. Therefore, the erroneous location data $\alpha_i$ or $\alpha_j$, including three bits, is developed in a parallel circuit relationship at the input terminals 218*i* or 218*j* including the three input terminals.

It is noted that a lead extending from the input terminal 218*i* or 218*j* includes three parallel leads and is designated by the reference numeral 3 above a slanted line crossing that lead. In the following description for FIGS. 21A and 21B, any lead with the abovementioned notation includes three parallel leads which are, in turn, connected to a triad of logic elements arranged in a parallel circuit relationship and the triad of logic elements are described as a single logic element unless otherwise stated.

Three selectors 220, 222 and 224 are connected to the respective sets of the input terminal 210, 212 and 214 and select successively data applied to the latter in the order of the first, second . . . and eighth tracks and in response to track selecting pulses EG21, EG22, . . . , and EG28 successively applied to the selectors.

The selectors 220, 222 and 224 include respective outputs connected to a delay circuit 226 formed of three 6 bit shift registers arranged in a parallel circuit relationship and having bit positions having shifting pulses DT24 applied thereto and also to one input of three EXCLUSIVE OR gates 228. Those gates 228 are connected to a memory device 230 including three MASTER-SLAVE FLIP-FLOP's having reset and clock pulses DT21 and DT22 applied to reset and clock inputs thereof. Each of the MASTER-SLAVE FLIP-FLOP's includes an output connected to the other input of its associated EXCLUSIVE OR gate 228 and also to each of the three D FLIP-FLOP's forming a shift register 232 having clock pulses DT23 applied to its clock input CLK and acting as a latch circuit. The shift reigster 232 is connected to an output terminal 234 representing three output terminals at which a 3 bit syndrome signal So is developed.

The outputs of the selectors 220, 222 and 224 are further connected to a multiplication circuit 236 having an $\alpha_i$ generator circuit 238 connected thereto. The multiplication circuit 236 and the $\alpha_i$ generator circuit 238 are similar in construction and connected in the same manner as described above in conjunction with the multiplication circuit 140 and the $\alpha_i$ generator circuit 138 shown in FIG. 11B. However, $\alpha_i$ generator circuit 238 has reset and clock pulses DT21 and DT22 applied to its reset and clock inputs R and CLK respectively. The $\alpha_i$ generator circuit 238 ma be formed of a ROM device, in which 3 bit patterns corresponding to the elements $\alpha_1, \alpha_2, \ldots, \alpha_6, 1, 0$ of the Galois field GF($2^3$) are preliminarily written and from which every three bits are successively read out in response to the clock pulses DT22. Alternatively, the $\alpha_i$ generator circuit 238 may be formed of a down counter as described above.

The multiplication circuit 236 is operative over the Galois field GF($2^3$) to deliver three bits with respect to each 6 bit input pattern and may be formed of a $2^6 \times 3$ bit ROM device. The multiplication circuit 236 is connected via EXCLUSIVE OR gates 240 and a memory device or a register 242 to a shift register or a latching circuit 244 in the same manner as the outputs of the selectors 220, 222 and 224 are connected to the shift register 232. The components 240, 242 and 244 are identical to the components 228, 230 and 232 respectively excepting that the component 244 or the shift register delivers a 3 bit syndrome signal $S_1$ to an output terminal 246 similar to the output terminal 234.

The output terminal 234 is connected to both a division circuit 248 and a multiplication circuit 250 to which the input terminal 218*j* is connected. The multiplication circuit 250 may be identical to the multiplication circuit 236. The division circuit 248 executes a division expressed by $S_1 \div S_0$ over the Galois field GF($2^3$) and may be formed of a $2^6 \times 3$ bit ROM device into which the results of this division are preliminarily written.

The $S_0\alpha_1$ multiplication circuit 250 is connected to one input of an EXCLUSIVE OR gate 252 whose other input is connected to the output terminal 246 and which delivers an output $(S_1 + \alpha_j S_0)$ to another division circuit 253. The input terminals 218*i* and 218*j* are connected to a pair of inputs of an EXCLUSIVE OR gate 254 which delivers an output $(\alpha_i + \alpha_j)$ to one input of an OR gate 256 whose other input is connected to the output of an AND gate 258. The AND gate 258 has one input connected to the output of the division circuit 248 and the other input connected to the input terminal 216-0. The OR gate 256 has an output connected to one input of the division circuit 253 operative to divide the output $(S_1 + \alpha_j S_0)$ from the EXCLUSIVE OR gate 252 by the output $(\alpha_j + \alpha_i)$ from the EXCLUSIVE OR gate 254 passed through the OR gate 256. The division circuit 253 may be formed of a $2^6 \times 3$ bit ROM device and has an output connected to one input of an EXCLUSIVE OR gate 259 whose other input is connected to the output terminal 234.

Each of the EXCLUSIVE OR gates 252, 254 or 259 executes the addition over the Galois field GF($2^3$) and includes three EXCLUSIVE OR gates arranged so that each of two inputs is supplied with a different one of three parallel bits and one output delivers each of three parallel bits.

The OR gate 256 includes three OR gates arranged so that their two sets of inputs are supplied with two sets of three parallel bits respectively and a single output delivers a different one of three bits in parallel.

The output of the division circuit 248 is connected to one input of an AND gate 260 whose other input is connected to the input terminal 216-1. The input terminal 218$i$ is connected to one input of an AND gate 262 whose other input is connected to the input terminal 216-1. An AND gate 264 has one input connected to one input of the AND gate 262 and the other input connected to the input terminal 216-2. An AND gate 266 has one input connected to the output of the division circuit 248 and the other input connected to an output of an OR gate 268 whose inputs are respectively connected to the input terminals 216-0 and 216-1.

The AND gates 260 and 262 are connected to a pair of inputs to a comparator 270 while the AND gates 264 and 266 are connected to the inputs of an OR gate 272. The output of the OR gate 268 is also connected to an inverter 274.

The input terminal 218$j$ is connected to one input of a comparator 275 whose other input is connected to another $\alpha_i$ generator 282. The comparator 276 has an output connected to one input of an AND gate 278 whose other input is connected to the output of the EXCLUSIVE OR gate 259. The AND gate 278 has an output connected to one input of an AND gate 280 whose other input is connected to the output of the inverter 274.

The $\alpha_i$ generator circuit 282 is identical to the $\alpha_i$ generator circuit 238 excepting that its clock input CLK is supplied with clock pulses DT25 but not with the clock pulse DT22 and is connected to the other input of the comparator 276 and also to one input of a comparator 284. The comparator 284 has its other input connected to the output of the OR gate 272 and has an output connected to one input of an AND gate 286. The AND gate 286 has its other input connected to the output of the division circuit 254 and has an output connected to one input of an AND gate 288 whose other input is connected to a coincidence output= of the comparator 270.

Then, an EXCLUSIVE OR gate 290 has three inputs connected to the delay circuit 226, outputs of the AND gates 280 and 288 respectively, and has an output connected to an output terminal 292 for the $C_2$ decoder 56.

Each of the AND gates 258, 260, 262, 266, 278, 280, 286 and 288 includes three AND gates arranged so that each of two inputs is supplied with a different one of three parallel bits and one output delivers each of three parallel bits.

The OR gate 272 is identical to the OR gate 256.

The EXCLUSIVE OR gate 290 includes three EXCLUSIVE OR gates arranged so that each set of three inputs is supplied with three parallel bits in parallel and one output delivers each of the three parallel bits.

The input terminal 216-3 is connected to one input of an OR gate 294 whose other input is connected to a non-coincidence input $\neq$ of the comparator 270. The OR gate 294 has an output connected to a set input S of a mode monitoring R-S FLIP-FLOP 296 having reset pulses DT18 supplied to its reset input R. This FLIP-FLOP 296 has an output connected to an output terminal 298 for use as a compensation flag.

Each of the comparators 270, 276 and 284 includes three gates arranged so that an output at the coincidence output $\neq$ is operative to turn three gates on and off. Therefore, the coincidence output= corresponds to three leads extended.

It is noted that each of the division circuits 248 or 254 is set to produce a null output with a division having a null value.

The $C_2$ decoder shown in FIG. 21 functions as a decoder for (8,6) Reed-Solomon codes over the Galois field $GF(2^3)$ as defined by the parity check matrix expressed by the expression (6). Such a decoder is operative to decode each Reed-Solomon code in the process divided in four stages including (i) the calculation of syndrome signals $S_0$ and $S_1$, (ii) the calculation of error positions, (iii) the calculation of error patterns and (iv) the correction of the errors.

In the first stage of calculating the syndrome signals $S_0$ and $S_1$, the syndrome signals $S_0$ and $S_1$ are first given by $$S_0 = \sum_{i=1}^{8} r_i \tag{10}$$

and $$S_1 = \sum_{i=1}^{8} r_i \alpha_i \tag{11}$$

where $r_1, r_2, \ldots, r_8$ designate the symbols of the Galois field $GF(2^3)$ or received symbols of the Reed-Solomon code or the code $C_2$. In other words, they are formed of transmitted symbols $a_1, a_2, \ldots, a_8$ added with the error patterns $e_1, e_2, \ldots, e_8$ respectively.

In the arrangement of FIG. 21A, the three selectors 220, 222 and 224 successively pick up data delayed in incremental manner by one codeword of the G.P. code from the eight rows or track in the order of the first, second, ..., eighth tracks in response to the track selecting pulses EG21, EG22, ..., EG28 successively applied thereto. The data picked up at a time include three bits for each track. The three EXCLUSIVE OR gates 228 cooperate with the M-S FLIP-FLOP's forming the memory circuit 230 to execute the addition following the expression. The resulting sum $S_0$ in the form of three parallel bits is supplied to the output terminal 234 through the 3×6 bit shift register 232.

As described above, $\alpha_i$ preliminarily written into the $\alpha_i$ generator circuit 238 is successively read out by the multiplication circuit 236. The read 3 bit $\alpha_i$'s and the 3 bit outputs $r_i$ from the selectors 220, 222 and 224 are successively applied to the multiplication circuit 236 where $r_i$'s are successively multiplied by $\alpha_i$'s. The memory circuit 242 including M-S FLIP-FLOP's form an adder with the three EXCLUSIVE OR gates 240 to perform the calculation following the expression (11) by adding successively the products from the multiplication circuit 236 to each other. The resulting sum $S_1$ in the form of three parallel bits is delivered to the output terminal 246 through the shift register 244.

The use of the Reed-Solomon code defined by the expression (6) permits the correction of the following cases:

(A) One erroneous track;
(B) The erasure of one track; and
(C) The erasure of two tracks.

The operation of the $C_2$ decoder as shown in FIGS. 21A and 21B will now be described in conjunction with errors or erasures differently caused on the tracks on the assumption that s designates the number of erasures or an erasure weight and e designates the number of undected errors. The abovementioned cases (A), (B) and (C) correspond to e=1 and s=0, e=0 and s=1, and e=0 and s=2 respectively.

For a better understanding of the operation of the $C_2$ decoder, the erasure of two tracks will first be described.

(i) Erasure of Two Tracks or e=0 and s=2.

It is assumed that errors have been caused on the i-th and j-th tracks where i is smaller than j. Under the assumed conditions, the decoding of the code $C_1$ gives erasure location data i and j. Then, corresponding values of $\alpha_i$ and $\alpha_j$ are calculated. For example, after clock pulses have been supplied to a 3 bit down counter set to a binary number or pattern (111) (i−1) and (j−1) times respectively, the down counter provides the erasure location data $\alpha_i$ and $\alpha_j$ respectively. Alternatively, the data $\alpha_i$ and $\alpha_j$ may be read out from a ROM device in which there are stored binary numbers of $\alpha_i$ in the order of the elements located in the first row on the righthand side of the expression (6) for the parity check matrix. In the latter case, the contents at the i-th and j-th addresses provide the data $\alpha_i$ and $\alpha_j$ respectively.

Then, data $e_i$ and $e_j$ are derived from the syndrome signals $S_0$ and $S_1$ developed at the output terminals 234 and 246 following the expressions $$S_0 = e_i + e_j \tag{12}$$

and $$S_1 = e_i\alpha_i + e_j\alpha_j \tag{13}$$

This results in $$e_i = (\alpha_j S_0 + S_1)/(\alpha_i + \alpha_j) \tag{14}$$

and $$e_j = e_i + S_0 \tag{15}$$

Signals for the $e_i$ and $e_j$ are formed in the arrangement of FIG. 21 as follows: When two erroneous tracks are detected, a binary ONE enters the input terminal 216-2 while the erasure position data $\alpha_i$ and $\alpha_j$ in the form of three parallel bits enter the input terminals 218i and 218j respectively. Thus the multiplication circuit 250 forms the product $\alpha_j S_0$ of $S_0$ from the output terminal 234 and the $\alpha_j$ from the input terminal 218j. Then, the EXCLUSIVE OR gate 252 adds $S_1$ from the output terminal 246 to $\alpha_j S_0$ from the multiplication circuit 250 to form the sum $S_1 + \alpha_j S_0$. Then, supplied to the division circuit 253 are the output $(S_1 + \alpha_j S_0)$ from the EXCLUSIVE OR gate 252 and an output $(\alpha_i + \alpha_j)$ from the EXCLUSIVE OR gate 254 passed through the OR gate 256. As a result, the division circuit 253 executes the division of $(S_1 + \alpha_j S_0)/(\alpha_i + \alpha_j)$ and produces the $e_i$ output in the form of three parallel bits.

On the other hand, the signal $S_0$ at the output terminal 234 is added to the output $e_i$ from the division circuit 254 by the EXCLUSIVE OR gate 259. Accordingly, the $e_j$ output is developed in the form of three parallel bits at the output of the gate 259.

The erasure location data $\alpha_i$ entered into the input terminal 218i passes through the gates 264 and 272 and then enters the comparator 284 because the AND gate 264 is opened at that time by means of the binary ONE developed at the input terminal 216-2 as described above. The $\alpha_j$ developed at the input terminal 218j is also supplied to the comparator 276. On the other hand, the $\alpha_i$ generator circuit 282 has supplied to its clock input CLK the shifting clock pulses DT25 to generate successively symbols, each including three bits. Under these circumstances, the AND gate 286 is permitted to pass the output $\alpha_i$ from the comparator 284 therethrough for a symbol time interval for which the signal $\alpha_i$ from the input terminal 218i coincides with the output from the $\alpha_i$ generator circuit 282. As a result, the error pattern $e_i$ passed through the AND gate 286 is applied to the EXCLUSIVE OR gate 290 through the AND gate 288 and added to the output from the shift register 226 in that gate 290 resulting in the correction of the error $e_i$. Under these circumstances, the AND gate 288 is always put in its open state to permit the error pattern $e_i$ to pass therethrough for the following reasons: Sincerely a binary ZERO is present at the input terminal 216-1, the AND gates 260 and 262 provide null outputs. Therefore, those null outputs are applied to the comparator 270 which, in turn, determines that the two applied inputs are equal to each other. Thus the comparator 270 delivers an output from its coincidence output=to the AND gate 288. Accordingly, the AND gate 288 is put in its open state to permit the error pattern $e_i$ to always pass therethrough.

In order to correct the error pattern $e_j$, the latter is applied to the other input of the AND gate 278 as described above. At that time, the AND gate 278 is put in its open state for a symbol time interval for which the signal $\alpha_j$ at the input terminal 218j coincides with the output from the $\alpha_i$ generator circuit 282 as determined by the comparator 276. The EXCLUSIVE OR gate 290 similarly adds the error pattern $e_j$ passed through the AND gate 280 to the output from the shift register 226 resulting in the correction of the error pattern $e_j$. At that time, the error pattern $e_j$ is permitted to pass through the AND gate 280 because the latter is put in its open state by means of the OR gate 268 and the inverter 274 except that binary ONE's are developed at the input terminals 216-0 and 216-1.

(ii) Non-Detection of One Erroeneous Track or s=0 and e=1.

Syndrome signals $S_0$ and $S_1$ may be expressed by $$S_0 = e_i \tag{16}$$

and $$S_1 = e_i\alpha_i \tag{17}$$

respectively. Therefore, $\alpha_i = S_1/S_0$ indicates error location information or data. At that time, both the erasure weight and location calculation circuits 192 and 194 respectively do not provide data concerning the erasure. That is, s has a null value. Under these circumstances, the division circuit 248 calculates the $\alpha_i$. Although the $\alpha_i$ is of a pattern of $S_0$, it is possible to correct the non-detection of one erroneous track by utilizing one portion of the circuit for correcting the erasure of two tracks as described above.

More specifically, the output of $S_1 + \alpha_i S_0$ from the EXCLUSIVE OR gate 252 has only the value of $S_1$ because $\alpha_j$ has a null value. Only when no erroneous track is detected, a binary ONE is developed at the input terminal 216-0 and applied to the AND gate 258. Therefore, the output $S_1/S_0$ or $\alpha_i$ from the division circuit 248 passes through the AND gate 258 and then enters the division circuit 253 through the OR gate 256. The division circuit 253 divides $S_1$ by $\alpha_i$ and produces the resulting quotient or output $e_i$ as seen from the expression (17).

On the other hand, the erasure location data passes through the AND gate 266 and then through the OR gate 272 until it is applied to the comparator 284. Subsequently, the signal $\alpha_i$ passes through the AND gate 286 which is put in its open state for a symbol time interval for which the signal $\alpha_i$ coincides with the output from the $\alpha_i$ generator circuit 282. Then, the EXCLUSIVE OR gate 290 executes the addition of $\alpha_i$ to the output from the shift register 226, resulting in the correction.

Under these circumstances, the OR gate 268 and the inverter 274 are operated to put the AND gate 280 in its closed state to prevent the other error pattern $e_j$ from entering the EXCLUSIVE OR gate 290. This ensures the right correction.

(iii) Erasure of One Track or s=1 and e=0.

The erasure weight and location calculation circuits 192 and 194 provide pieces of information indicating the detection of one erroneous track. Under these circumstances, a binary ONE is developed at the input terminal 216-1 and the signal $\alpha_i$ is developed at the input terminal 218$i$. At that time, it is assumed that the signal $\alpha_j$ in the form of all three bits of binary ZERO's is applied to the input terminal 218$j$. The signal $\alpha_j$, including all bits of binary ZERO's, indicates the eighth track as will readily be understood from the parity check matrix represented by the expression (6).

Then, the comparator 270 determines if the signal $\alpha_i$ at the input terminal 218$i$ or the value of $\alpha_i$ based on erasure information coincides with the output from the division circuit 248 calculated from the syndrome signals $S_0$ and $S_1$ alone. When determined so, the comparator 270 delivers a binary ONE at the coincidence output=thereof. This causes the AND gate 288 to be put in its open state. Therefore, the correction is effected in the process as described above in conjunction with (ii) Non-Detection of One Erroneous Track.

(iv) Detection of One Erroneous Track and Erasure of One Track or s=1 and e=1.

Each of the erasures weight and location calculation circuits 192 or 194 produces only a single piece of erasure information. Assuming that a detected error has caused on the i-th track, the syndrome signals $S_0$ and $S_1$ may be expressed by $$S_0 = e_i + e_{i'} \tag{18}$$

and $$S_1 = e_i \alpha_i + e_{i'} \alpha_{i'} \tag{19}$$

respectively. Therefore, the output $S_1/S_0$ from the division circuit 248 may be expressed by $$S_1/S_0 = (e_i \alpha_i + e_{i'} \alpha_{i'})/(e_i + e_{i'}). \tag{20}$$

On the other hand, the signal $\alpha_i$ developed at the input terminal 218$a$ due to the erasure location calculation circuit 194 does not generally coincide in value with the $S_1/S_0$ appearing in the expression (20) or at the output from the division circuit 248. Thus, a non-coincidence is determined by the comparator 270. As a result, the comparator 270 delivers a binary ONE at the non-coincidence output ≠ thereof while delivering a binary ZERO at the coincidence output=. This binary ZERO, which is supplied the AND gate 288, puts the latter in its closed state to thereby prevent the correction. At the same time, the binary ONE is applied via the OR gate 294 to the set input S of the R-S FLIP-FLOP 296 which serves to change the normal correction mode to the compensation mode and vice versa.

In response to non-coincidence information originating from the comparator 270, the R-S FLIP-FLOP 296 supplies a binary ONE to the compensation flag output terminal 298 while holding this information for a decoding time interval required for a codeword of the particular G.P. code to be decoded. This decoding time interval is just long enough to decode a Reed-Solomon code which is a code $C_2$ 50 (which equals 150 divided by 3) times.

Under these circumstances, the compensation circuit 62 (see FIG. 6) is enabled to apply data of that codeword of the G.P. code just preceding that codeword including the error to the digital-to-analog converter 64 (see FIG. 6).

The R-S FLIP-FLOP 296 is reset in response to a reset pulse DT18 applied to its reset input R so as to apply a binary ZERO to the output terminal 298. At that time, the normal correction is effected so that the compensation circuit 62 is operated to supply to the digital-to-analog converter 64 an unchanged output from the $k_2 \times k_1$ information matrix reproducing circuit 60.

(v) Detection of Errors on Not Less Than Three Tracks.

From the expression (4) it is seen that errors are caused whose number exceeds the correction capability. At that time, a binary ONE from the input terminal 216-3 is applied to the R-S FLIP-FLOP 296 through the OR gate 294. Therefore, the R-S FLIP-FLOP 296 supplies a binary ONE to the output terminal 298 whereby the compensation circuit 62 (see FIG. 6) corrects the errors in the manner as described above in conjunction with the non-coincidence information from the comparator 270.

Figure 22:
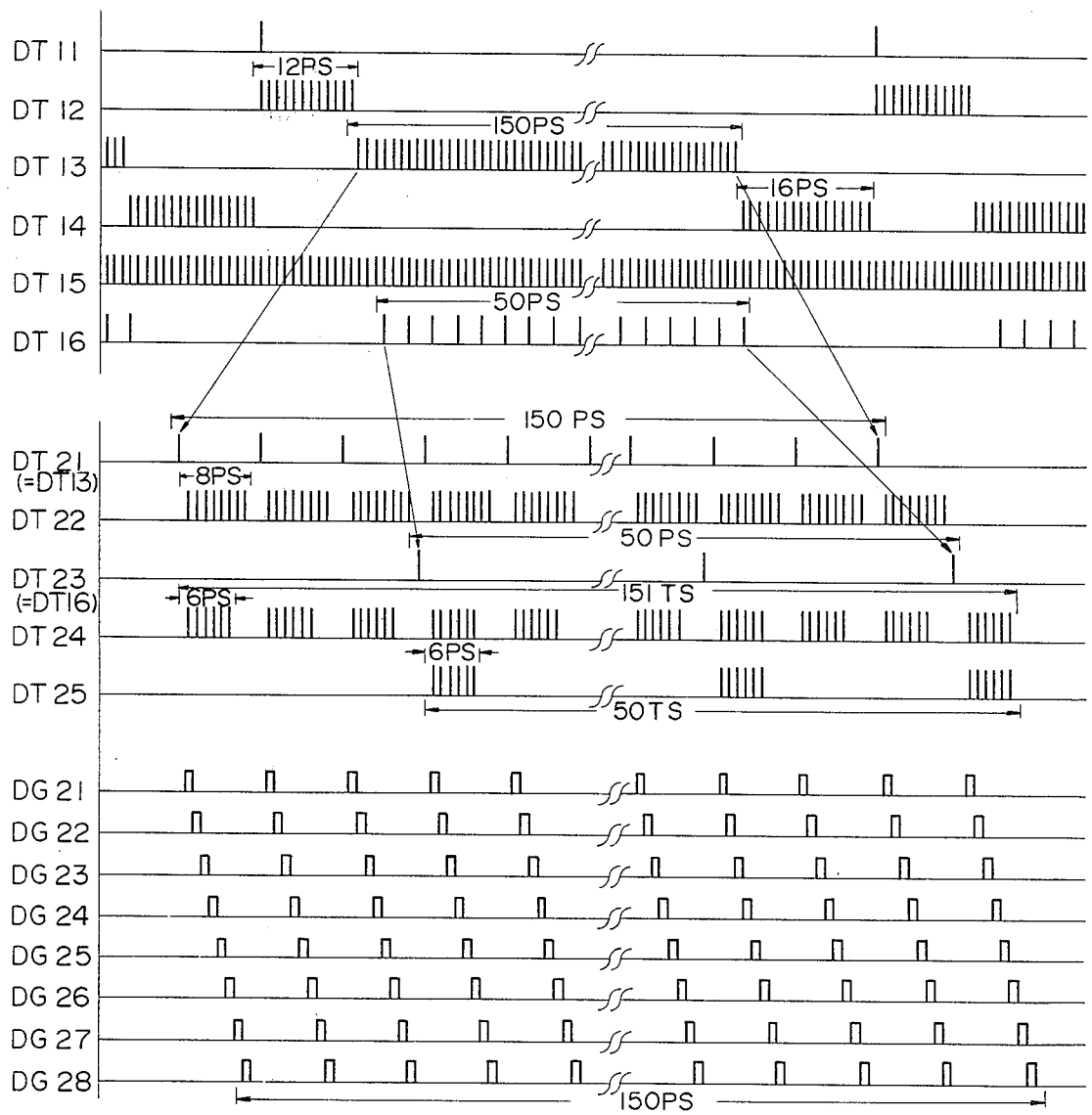
FIG. 22 is a timing chart illustrating timing signals applied to the arrangement shown in FIGS. 15, 16, 17, 21A and 21B.

FIG. 22 is a timing chart illustrating timing signals applied to the arrangements shown in FIGS. 15, 16, 17 and 21A and 21B. In FIG. 22, DT11 designates trains of block or frame timing pulses, each developed at a partition between one codeword of the G.P. code and an associated synchronizing pattern. DT12 designates a train of 12 timing pulses for writing a synchronizing pattern following each frame pulse DT11. A train of 150 timing pulses DT13 for writing information bits of a code $C_1$ follows the train of pulses DT13 and is followed by a train of sixteen timing pulses for writing check bits for the code $C_1$, the last pulse being developed immediately before the next succeeding frame pulse DT14. DT15 designates a train of timing pulses for bits including 178 clock pulses for each frame. DT16 designates a train of 50 pulses for partitioning bits running along an associated channel into three bits apiece for purposes of calculation.

DT21 designates the train of timing pulses DT13 shown on an extended time base and having a pulse repetition period in which a train of eight timing pulses DT22 is developed for executing calculation of bits included in the eight tracks at bit intervals. DT23 is the train of pulses DT16 shown on an extended time base and operative to transfer the result of the abovementioned calculation at three bit intervals. DT24 designates shifting pulses for the shift register 226. The shifting pulses DT24 are shown as including 25 trains of pulses, each formed of six pulses developed in one pulse repetition period of the pulses DT11. Those pulses DT24 form timing pulses for successively supplying information bits to the EXCLUSIVE OR gate 290 to correct error patterns. Further timing pulses DT25 are shown as including 50 pulse trains, each formed of six pulses which serve to add the error pattern to the output from the shift register 226 by means of the EXCLUSIVE OR gate 290.

Finally DG21, DG22, ..., DG28 designate pulse trains of 150 track pulses successively applied to the selectors 220, 222 and 224 in order to successively pick up information bits from the eight tracks, one bit at an interval. The temporal relationship between each train of pulses and the next succeeding trains of pulses is similar to that described above in conjunction with the trains of pulses EG21, EG22, ..., EG26 shown in FIG. 12.

Figure 23:
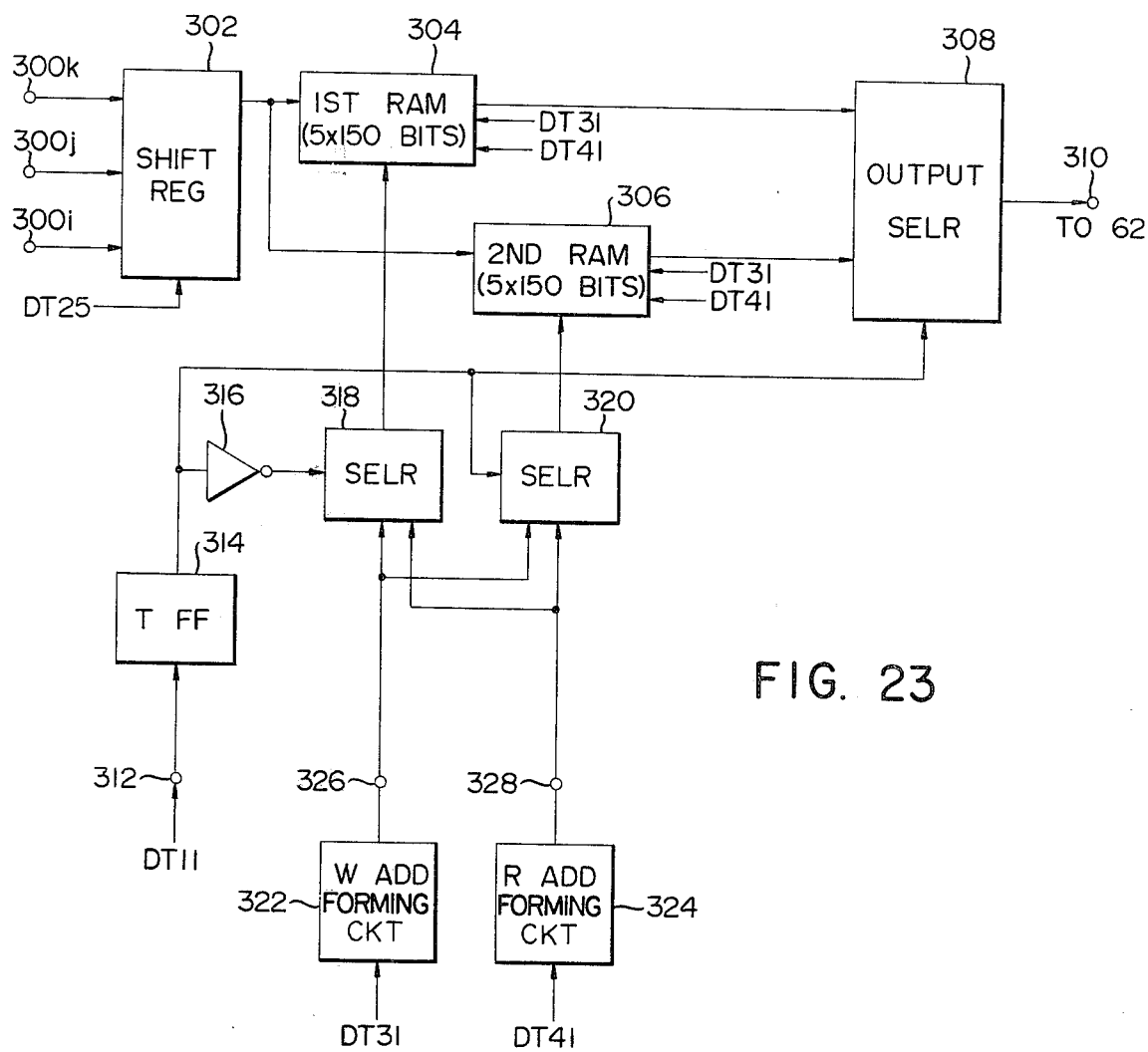
FIG. 23 is a block diagram of the $k_2 \times k_1$ information matrix reproducing circuit shown in FIG. 6B.

FIG. 23 illustrates the details of a typical $k_2 \times k_1$ information matrix reproducing circuit shown at block 60 in FIG. 6B. The arrangement illustrates a set of input terminals 300k, 300j and 300i connected to a parallel in-serial out 3 bit shift register 302 controlled with the shifting pulses DT25 which is, in turn, connected to a first and a second RAM device 304 and 306 respectively. Each of the RAM devices 305 or 306 has a capacity of $6 \times 150$ bits and is selectively supplied with write pulses DT31 and read pulses DT41. Outputs of the first and second RAM devices 304 and 306 are connected to an output selector 308 subsequently connected to an output terminal 310.

The arrangement further includes another input terminal 312 having applied thereto a timing pulse indicating a partition between each pair of adjacent rectangular arrays, each array including $6 \times 150$ bits. That timing pulse is applied to T FLIP-FLOP 314 to be halved in pulse repetition frequency. The T FLIP-FLOP 314 output is connected to an inverter 316 which is in turn connected to a selector 318. The T FLIP-FLOP 314 output is also connected to the output selector 308 and to another selector 320. The selectors 318 and 320 are connected to the first and second RAM devices 304 and 306 respectively and are operative to alternately put the associated RAM devices in the write and read cycles of operation for each rectangular array of $6 \times 150$ bits under the control of write and read address forming circuits 322 and 324 respectively.

Each of the write and read address forming circuits 322 and 324 respectively includes a counter and a counter decoding circuit therein and are driven with timing pulses DT31 or DT41 to successively form write or read addresses respectively by counting the pulses DT31 or DT41 with their associated counter. The write and read address forming circuits 322 and 324 are connected to the selectors 318 and 320 through output terminals 326 and 328 respectively.

The output selector 308 is adapted to be always connected to that RAM devices put in the read cycle of operation. Therefore, the selector 308 successively reads out data in the form of samples, each sample including the original 15 bits from that RAM device operated in the read cycle. The data read out by the output selector 308 is successively delivered to the compensation circuit through the output terminal 310.

Figure 24A:
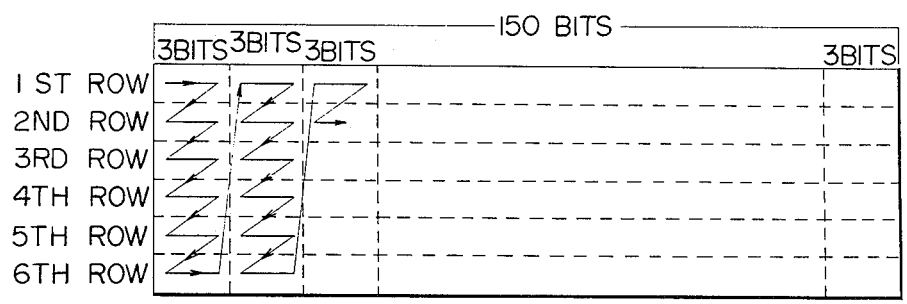
FIG. 24A is a schematic diagram illustrating a sequence in which data is written into each of the RAM devices shown in FIG. 23.

Data is written in that RAM device put in the write cycle of operation in the sequence shown in FIG. 24A. As shown, every three bits are written in first three columns of that RAM device in the order of first, second, third, fourth, fifth and sixth rows to form a first $6 \times 3$ bit rectangular array. Then, every three bits are written in the next three columns of the device in the same order to a second $6 \times 3$ rectangular array of $6 \times 3$ bits. This writing process is executed with all the columns of the RAM device to form 50 rectangular arrays of $6 \times 3$ bits arranged in the column direction within the RAM device operated in the write cycle.

Figure 24B:
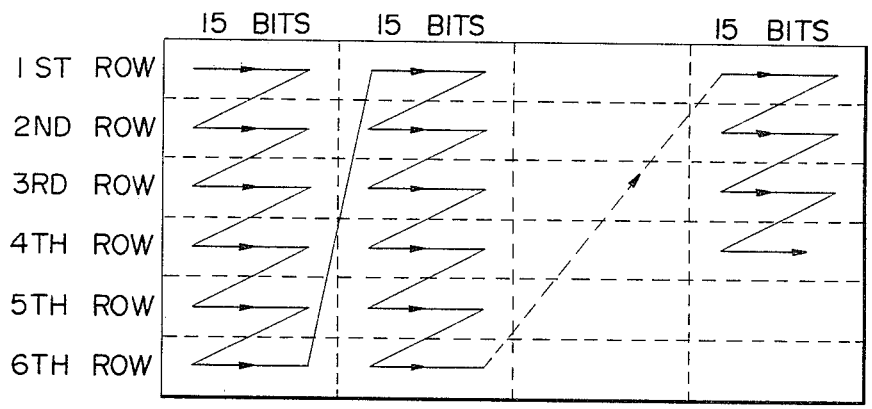
FIG. 24B is a schematic diagram illustrating a sequence in which data is read out from each of the RAM devices shown in FIG. 23.

Data stored in each of the RAM devices 304 or 306 is read out from that device put in the read mode of operation in the sequence shown in FIG. 24B. The reading sequence is different from the writing sequence shown in FIG. 24A only in that in FIG. 24B every fifteen bits are read out as one sample.

Figure 25:
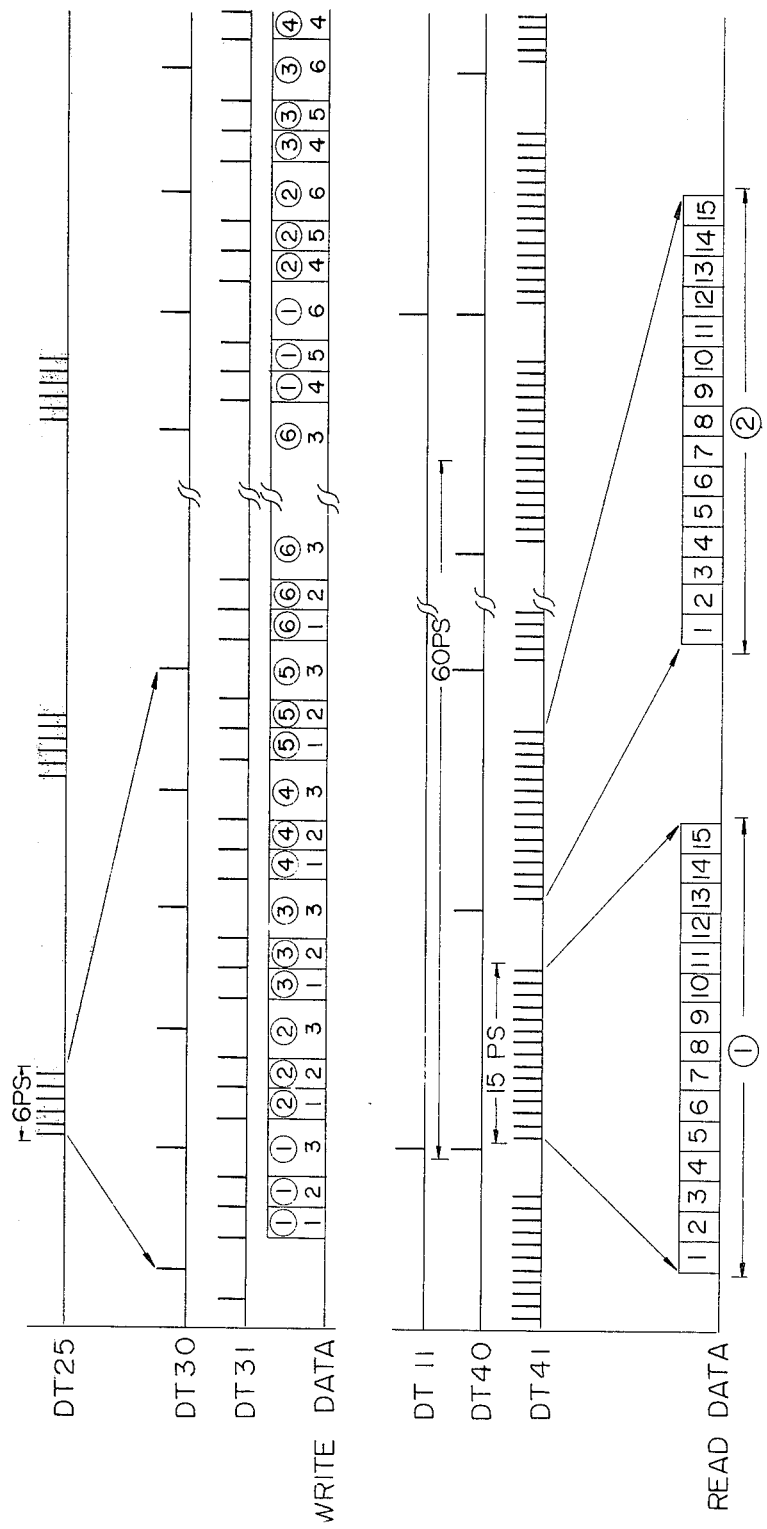
FIG. 25 is a timing chart of illustrating timing signals applied to the arrangement shown in FIG. 23.

FIG. 25 shows various trains of timing pulses as described above in conjunction with FIG. 23. In FIG. 25, a first row shows the train of pulses DT25 described above in conjunction with FIG. 22 and a second row shows the train of timing pulses DT30 which is a replica of the train pulse DT25 but illustrated on an extended time base. A third row shows the train of writing pulses DT31 including three pulses developed within one pulse repetition period of the pulse train DT30. A fourth row shows data written in the RAM device 304 and 304 under the control of the pulse trains DT31. More specifically, the input terminals 300k, 300j and 300i successively receive data in the form of three parallel bits from the output terminal 292 (see FIG. 21). This data is applied to the shifter register 302 which delivers serially the data to that RAM device put in the write cycle of operation where the data is continuously written into bit positions as determined by the write address forming circuit 322 as shown in the fourth row labelled WRITE DATA where the reference numerals 1 through 6 in the circle designate row numbers and reference numerals 1, 2 and 3 designate the bit positions located in each row of the device.

A pulse train DT11 shown in a fifth row is identical to the pulse train of block timing signals DT11 illustrated in FIG. 22, and the pulse train DT40 is shown under the pulse train DT11 as including 60 pulses within one pulse repetition period of the pulse train DT11. The pulse train DT40 is also applied, as a conversion signal, to the digital-to-analog converter 64 (see FIG. 6B) connected to the output terminal 310 of the $k_2 \times k_1$ matrix reproducing circuit shown in FIG. 23. A seventh row shows a pulse train DT41, including 15 read pulses DT41, developed within one pulse repetition period of the pulses DT40. The lowermost low labelled READ DATA shows data read out from that RAM device put in the read cycle of operation. The reference numerals 1, 2, ... in the circles designate successive samples, each sample including fifteen bits designated by the reference numerals 1, through 15.

Referring back to FIG. 23, the T FLIP-FLOP 314 and the inverter 316 are operated to put one of the RAM devices 304 or 306 in the read cycle of operation and to successively deliver every fifteen bits to the output terminal 310 through the output selector 308, as shown in the lowermost row in FIG. 25, at that time when the other RAM device is operated in the write cycle.

Therefore, the RAM devices 304 and 306 are alternately operated in the write and read modes for each rectangular array of $6 \times 150$ bits, while the output selector 308 alternately reads data out from the two RAM devices resulting in the continuous delivery of data to the output terminal 310 (see FIG. 23).

It is to be understood that, if a quotient $k_1/f$ designating the parameter for codes $C_2$ is not an integer, then the $k_1$ bits may be suffixed with dummy bits so as to render the sum of $k_1$ and the number of the dummy bits equal to b multiplied by an integer.

While the present invention has been illustrated in conjunction with a single preferred embodiment thereof, it is to be understood that numerous changes and modifications may be resorted to without departing from the spirit and scope of the present invention. For example, the arrangement shown in FIGS. 17, 21 and 23 has been described in conjunction with the code $C_1$ used as a error detecting code, but it is to be understood that the present invention is equally applicable to the code $C_1$ used as either an error correction code or both an error correction and an error detecting code. With the code $C_1$ used as the error correction code, the erasure weight and location calculation circuits are not required.

With the code $C_1$ used as the error correction code, the arrangement of FIG. 21 is operated as follows: The input terminals 210, 212 and 214 have entered thereinto a codeward of code $C_1$ after the correction of errors. However, those input terminals may receive a code $C_1$ erroneously corrected but not rightly as it remains intact. In the latter case, it is assumed that such a code $C_1$ is corrected upon decoding an associated code $C_2$.

Assuming that a binary ONE is applied to the input terminal 216-O while a binary ZERO is applied to each of the input terminals 216-1, 216-2, 216-3, 218i and 218j, the arrangement of FIG. 21 can be used for correction purposes.

With a code $C_1$ used for the purposes of detecting and correcting errors, the received $C_2$ word forming circuit shown in FIG. 16, the erasure weight and location calculation circuits shown in FIG. 17, the $C_2$ decoder shown in FIG. 21 etc. may be used in the same manner as they are used with the code $C_1$ for the purpose of detecting errors only. More specifically, the received $C_2$ word forming circuit 54 (see FIG. 6B) delivers to the $C_2$ decoder 56 (see FIG. 6B) information bits after the correction of errors. At that time, the $C_2$ decoder 56 may receive information bits corrected erroneously.

It is here assumed that, when the codes $C_1$ have been decoded, the same correct s erasures in the horizontal direction and erroneously corrected e errors caused in the correction or non-detection of e errors in the horizontal direction. Under the assumed conditions, the $C_2$ decoder 56 can correct s erasures and e errors corrected erroneously or undetected in the same manner as described above in conjunction with the code $C_2$ used only for error detecting purposes as long as the expression (4) holds.

The foregoing is equally applicable to the correction of error patterns other than those shown in FIG. 1, for example, one-dimensional random errors, one-dimensional burst errors, two-dimensional random errors and two-dimensional burst errors.

Also the present invention has been described in conjunction with a binary code but it is to be understood that the same is equally applicable to q-dimension codes where q is a prime number. Further while the present invention has been described in conjunction with rectangular arrays of bits having the parameters whose numbers are specified, it is to be understood that present invention is not restricted to apply to systems having rectangular arrays of bits.

Further while the present invention has been illustrated and described in conjunction with a plurality of $C_1$ encoders, it is to be understood that a single $C_1$ encoder may be used to encode every $k_1$ bits into every $n_1$ bits, this encoding being repeated $n_2$ times. This is true in the case of a plurality of $C_1$ decoders.

What we claim is:

1. An encoding and decoding system for digital information having a rectangular array of bits including $k_1$ bits in a first direction and $k_2$ bits in a second direction orthogonal to the first direction which system comprises encoding means including an encoding adapting circuit for codes $C_2$ for dividing the $k_1$ bits in the first direction into b bits apiece, and forming a plurality of $k_2 \times b$ bit rectangular arrays each including the b bits in the first direction and the $k_2$ bits in the second direction, a $C_2$ encoder for encoding the plurality of $k_2 \times b$ bit rectangular arrays into a plurality of $n_2 \times b$ bit rectangular arrays each including the b bits in the first direction and $n_2$ bits in the second direction, a $C_1$ encoder for encoding the $k_1$ bits in the first direction into $n_1$ bits by adding $n_1 - k_1$ check bits to the $k_1$ bits in the first direction, and a timing generator circuit for generating timing signals for controlling the operation of said encoding means to thereby encode the digital information into a codeword of a generalized product code including the $n_1$ bits in the first direction and the $n_2$ bits in the second direction; and decoding means operatively connected to said encoding means by a transmission means for decoding the digital information encoded by the encoding means; wherein said $C_1$ and $C_2$ encoders are operative to encode in response to said timing signals of said timing generator and wherein either said $C_1$ encoder or said $C_2$ encoder provides said generalized product code.

2. An encoding and decoding system for digital information as claimed in claim 1, wherein the encoding means further includes an information matrix forming circuit for forming digital information not originally arranged in a rectangular array of bits into a rectangular array of bits including $k_1$ and $k_2$ bits in the first and second directions respectively; wherein said information matrix forming circuit and said $C_1$ and $C_2$ encoders are operatively connected together and wherein said digital information from said information matrix forming circuit is encoded by either said $C_1$ or $C_2$ encoders.

3. An encoding and decoding system for digital information as claimed in claim 2, wherein the information matrix forming circuit includes a pair of RAM devices, selector means connected to the pair of RAM devices to alternately place said RAM devices in their write and read cycles of operation and another selector means connected to the pair of RAM devices to read out data from the RAM device operated in its read cycle.

4. An encoding and decoding system for digital information as claimed in claim 1, wherein the encoding adapting circuit for the code $C_2$ comprises delay circuits.

5. An encoding and decoding system as claimed in claim 4, wherein the encoding adapting circuit for the code $C_2$ includes a plurality of series combinations of b 1-bit delay circuits one for each row in the first direction, each of the delay circuits delaying an input applied thereto by one bit.

6. An encoding and decoding system for digital information as claimed in claim 4, wherein the encoding adapting circuit for the code $C_2$ includes RAM means and control circuit means for controlling addresses in the RAM means.

7. An encoding and decoding system for digital information as claimed in claim 1, wherein the decoding means is disposed on the receiver side to receive a code-word of a generalized product code in the form of the rectangular array including the $n_1$ and $n_2$ bits in the first and second directions respectively through a selected one of a group of channels and a record medium and wherein the decoding means includes a plurality of $C_1$ decoders one for every $k_2$ bits in the second direction for decoding the $k_1$ bits in the first direction from the $n_1$ bits in the first direction, a received word-of-code $C_2$ forming circuit for dividing an outputs from the $C_1$ decoders into b bits apiece and forming a plurality of rectangular arrays including b bits in the first direction and $n_2$ bits in the second direction, and a $C_2$ decoder for decoding the rectangular arrays of $k_2 \times b$ bits from the rectangular arrays of $n_2 \times b$ bits.

8. An encoding and decoding system for digital information as claimed in claim 7, wherein the received work-of-code $C_2$ forming circuit includes a plurality of series combinations of b 1-bit delay circuits one for each row in the second direction, each of the delay circuits delaying an input applied thereto by one bit.

9. An encoding and decoding system for digital information as claimed in claim 7, wherein the received word-of-code $C_2$ forming circuit includes RAM means and control circuit means for controlling addresses in the RAM means.

10. An encoding and decoding system for digital information having a rectangular array of bits including $k_1$ bits in a first direction and $k_2$ bits in a second direction orthogonal to the first direction which system comprises encoding means including an encoding adapting circuit for codes $C_2$ for dividing the $k_1$ bits in the first direction into b bits apiece, and for forming a plurality of $k_2 \times b$ bit rectangular arrays each including the b bits in the first direction and the $k_2$ bits in the second direction, a $C_2$ encoder for encoding the plurality of $k_2 \times b$ bit rectangular arrays into a plurality $n_2 \times b$ bit rectangular arrays each including the b bits in the first direction and $n_2$ bits in the second direction, a $C_1$ encoder for encoding the $k_1$ bits in the first direction into $n_1$ bits by adding $n_1 - k_1$ check bits to the $k_1$ bits in the first direction, and a timing generator circuit for generating timing signals for controlling the operation of said encoding means to thereby encode the digital information into a codeword of a generalized product code including the $n_1$ bits in the first direction and the $n_2$ bits in the second direction; and decoding means operatively connected to said encoding means by a transmission means for decoding the digital information encoded by the encoding means;

wherein said $C_1$ and $C_2$ encoders are operative to encode in response to said timing signals of said timing generator and wherein either said $C_1$ encoder or $C_2$ encoder provides said generalized product code of said encoding means;

wherein the encoding means further includes an information matrix forming circuit for forming digital information not originally arranged in a rectangular array of bits into a rectangular array of bits including the $k_1$ and $k_2$ bits in the first and second directions respectively;

wherein the decoding means is disposed on the receiver side to receive a codeword of a generalized product code in the form of the rectangular array including the $n_1$ and $n_2$ bits in the first and second directions respectively through a selected one of a group of channels and a record medium and wherein the decoding means includes a plurality of $C_1$ decoders one for every $k_2$ bits in the first direction for decoding the $k_1$ bits in the first direction from the $n_1$ in the first direction, a received word-of-code $C_2$ forming circuit for dividing an outputs from the $C_1$ decoders into b bits apeice and forming a plurality of rectangular arrays including b bits in the first direction and $n_2$ bits in the second direction, and a $C_2$ decoder for decoding the rectangular arrays of $k_2 \times b$ bits from the rectangular arrays of $n_2 \times b$ bits;

wherein the decoding means further includes an information matrix reproducing circuit for reproducing the rectangular array including the $k_1$ and $k_2$ bits in the first and second directions respectively from an output from the $C_2$ decoder.

11. An encoding and decoding system for digital information as claimed in claim 1 wherein the decoding means further includes an erasure weight calculation circuit and an erasure location calculation circuit for producing respectively erasure weight information and erasure location information indicating errors detected in codes $C_1$ and means for correcting codes $C_2$ by utilizing the erasure weight information and erasure location information obtained from decoding code $C_1$.

12. An encoding and decoding system for digital information having a rectangular array of bits including $k_1$ bits in a first direction and $k_2$ bits in a second direction orthogonal to the first direction which system comprises encoding means including an encoding adapting circuit for codes $C_2$ for dividing the $k_1$ bits in the first direction into b bits apiece, and forming a plurality of $k_2 \times b$ bit rectangular arrays each including the b bits in the first direction and the $k_2$ bits in the second direction, a $C_2$ encoder for encoding the $k_1$ bits in the first direction into $n_1$ bits by adding $n_1 - k_1$ check bits to the $k_1$ bits in the first direction, and a timing generator circuit for generating timing signals for controlling the operation of said encoding means to thereby encode the digital information into a codeword of a generalized product code including the $n_1$ bits in the first direction and the $n_2$ bits in the second direction; and decoding means operatively connected to said encoding means by a transmission means for decoding the digital information encoded by the encoding means;

wherein said $C_1$ and $C_2$ encoders are operative to encode in response to said timing signals of said timing generator and wherein either said $C_1$ encoder or $C_2$ encoder provides said generalized product code of said encoding means;

wherein the encoding means further includes an information matrix forming circuit for forming digital information not originally arranged in a rectangular array of bits into a rectangular array of bits including the $k_1$ and $k_2$ bits in the first and second directions respectively;

wherein the decoding means is disposed on the receiver side to receive a codeword of a generalized product code in the form of the rectangular array including the $n_1$ and $n_2$ bits in the first and second directions respectively through a selected one of a group of channels and a record medium and wherein the decoding means includes a plurality of $C_1$ decoders one for every $k_2$ bits in the first direction for decoding the $k_1$ bits in the first direction from the $n_1$ bits in the first direction, a received word-of-code $C_2$ forming circuit for dividing an outputs from the $C_1$ decoders into b bits apiece and forming a plurality of rectangular arrays including b bits in the first direction and $n_2$ bits in the second direction, and a $C_2$ decoder for decoding the rectangular arrays of $k_2 \times b$ bits from the rectangular arrays of $n_2 \times b$ bits;

wherein the decoding means further includes an erasure weight calculation circuit and an erasure location calculation circuit for producing respectively erasure weight information and erasure location information indicating errors detected in codes $C_1$ and means for correcting codes $C_2$ by utilizing the erasure weight information and erasure location information obtained from decoding the code of $C_1$.

13. An encoding and decoding system for digital information as claimed in claims 11 or 12, wherein the erasure weight calculation circuit includes an $n_2$ bit parallel in-serial out shift register, a b bit binary counter and a counter decoder circuit and the erasure location calculation circuit comprises an ROM device including addresses determining input patterns applied thereto and output patterns preliminarily stored at the addresses.

14. An encoding and decoding system for digital information as claimed in claims 11 or 12 wherein the erasure weight calculation circuit comprises an ROM device including addresses determining input patterns applied thereto and output patterns preliminarily stored at the addresses and the erasure location calculation circuit comprises an ROM device including addresses determining input patterns applied thereto and output patterns preliminarily stored at the addresses.

* * * * *